(12) United States Patent
Kawara et al.

(10) Patent No.: US 6,278,836 B1
(45) Date of Patent: Aug. 21, 2001

(54) INFORMATION REPRODUCING APPARATUS FOR REPRODUCING VIDEO SIGNALS AND PROGRAM INFORMATION WHICH ARE RECORDED IN INFORMATION RECORDING MEDIA

(75) Inventors: Toshiyuki Kawara, Hirakata; Masatoshi Shinbo, Minooshi; Hiroshi Taniguchi, Hirakata, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 08/917,509

(22) Filed: Aug. 26, 1997

(30) Foreign Application Priority Data

Aug. 27, 1996 (JP) .................................................. 8-224890

(51) Int. Cl.[7] .................................................. H04N 5/91
(52) U.S. Cl. ............................ 386/94; 360/60; 380/203; 705/54; 705/57
(58) Field of Search ................................ 386/94, 95, 97, 386/102, 104, 106; 380/203; 360/60; 348/460; 705/54, 57; 707/9; H04N 5/91

(56) References Cited

U.S. PATENT DOCUMENTS

| 5,400,077 | * | 3/1995 | Cookson et al. ............ 348/556 |
| 5,576,843 | * | 11/1996 | Cookson et al. ............ 386/97 |
| 5,627,655 | * | 5/1997 | Okamoto et al. ............ 386/94 |
| 5,638,443 | * | 6/1997 | Stefik et al. ............... 380/4 |
| 5,805,530 | * | 9/1998 | Youngberg ................. 368/47 |
| 5,822,676 | * | 10/1998 | Hayashi et al. ............ 386/94 |
| 5,960,151 | * | 9/1999 | Takahashi et al. .......... 386/94 |
| 5,990,966 | * | 11/1999 | Watamoto ................. 348/460 |
| 6,009,433 | * | 12/1999 | Kurano et al. ............ 707/100 |

FOREIGN PATENT DOCUMENTS 4-98556   3/1992 (JP) .

* cited by examiner

Primary Examiner—Wendy R. Garber
Assistant Examiner—Vincent F. Boccio
(74) Attorney, Agent, or Firm—Parkhurst & Wendel, L.L.P.

(57) ABSTRACT

Disclosed is an information reproducing apparatus for reading out main information to be a target of reproduction and auxiliary information to control reproduction of the main information from an information recording medium containing the main information and the auxiliary information, and reproducing the main information according to the auxiliary information. This apparatus comprises reproduction restricting information extracting means for extracting reproduction restricting information used for reproduction restriction of a part or the whole of the read-out main information, from the read-out auxiliary information; reproduction restricting information used for deciding one of various modes of reproduction restriction including a mode in which reproduction restriction is not performed; and reproduction restricting means for performing reproduction restriction of a part or the whole of the read-out main information in the mode of reproduction restriction decided by the reproduction restriction decision means. Therefore, reproduction of information, which is recorded on an information recording medium such as an optical disk and available by reproduction, can be restricted in a desired mode, whereby the use of a software, such as a movie or a computer program, can be restricted.

12 Claims, 22 Drawing Sheets

Fig.4

| area code | | area name |
|---|---|---|
| 1 | first area | USA, Canada, Mexico |
| 2 | second area | Europe, Middle and Near East, Egypt, Republic of South Africa, Japan, South Korea, North Korea |
| 3 | third area | Southeast Asia, Taiwan, Hong Kong, China, India, Afghanistan, Pakistan |
| 4 | fourth area | South and Central America, Oceania |
| 5 | fifth area | Commonwealth of Independent States, Mongolia, African countries except Egypt and Republic of South Africa |
| 6 | sixth area | undefined |
| 7 | seventh area | undefined |
| 8 | eighth area | undefined |

Fig.6 (a)

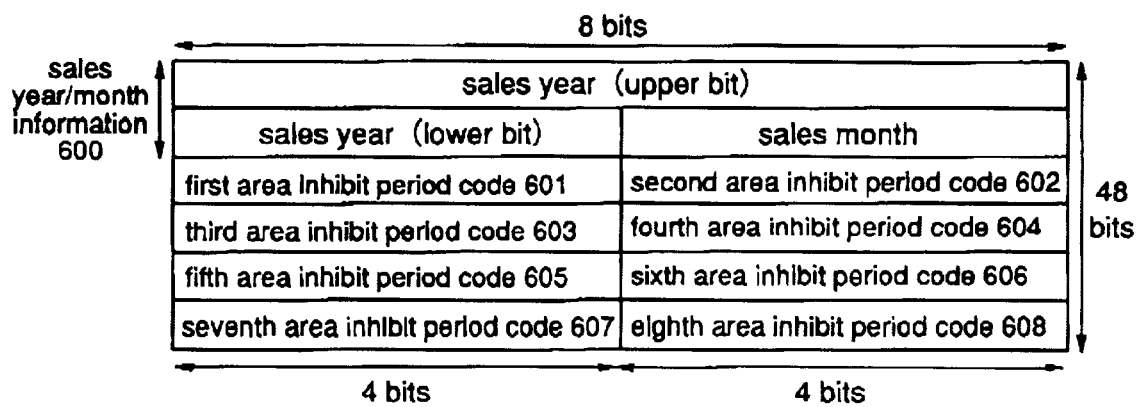

| sales year/month information 600 | 8 bits | |
|---|---|---|
| | sales year (upper bit) | |
| | sales year (lower bit) | sales month |
| | first area inhibit period code 601 | second area inhibit period code 602 |
| | third area inhibit period code 603 | fourth area inhibit period code 604 |
| | fifth area inhibit period code 605 | sixth area inhibit period code 606 |
| | seventh area inhibit period code 607 | eighth area inhibit period code 608 |
| | 4 bits | 4 bits |

(48 bits total)

Fig.6 (b)

| inhibit period code | inhibit period |
|---|---|
| 0000 | no inhibit period |
| 0001 | a half year (6 months) |
| 0010 | one year (12 months) |
| 0011 | one year and a half (18 months) |
| 0100 | two years (24 months) |
| 0101 | two years and a half (30 months) |
| 0110 | three years (36 months) |
| 0111 | three years and a half (42 months) |
| 1000 | four years (48 months) |
| 1001 | four years and a half (54 months) |
| 1010 | five years (60 months) |
| 1011 | five years and a half (66 months) |
| 1100 | six years (72 months) |
| 1101 | six years and a half (78 months) |
| 1110 | seven years (84 months) |
| 1111 | permanent inhibition |

INFORMATION REPRODUCING APPARATUS FOR REPRODUCING VIDEO SIGNALS AND PROGRAM INFORMATION WHICH ARE RECORDED IN INFORMATION RECORDING MEDIA

FIELD OF THE INVENTION

The present invention relates to information reproducing apparatus and information recording media. More particularly, the invention relates to information reproducing apparatus for reproducing video signals and program information which are compressively encoded and recorded in information recording media such as optical disks. The invention also relates to information recording media such as optical disks for recording compressively encoded video signals and program information.

BACKGROUND OF THE INVENTION

In recent years, with a development in digital storage media, methods of compressing and recording long-time moving pictures in these recording media have been examined. In International Organization for Standarization (ISO), a working group of International Electrotechnical Commission (IEC), "MPEG (Moving Picture Image Coding Experts Group)" has been active for standarization of moving picture coding methods. For example, there is "ISO/IEC 13818-2 (MPEG2)" as an international standard of moving picture coding method. Employing such a moving picture coding method, a long-time moving picture, such as a movie, can be recorded in a single recording medium, such as an optical disk, while maintaining high picture quality.

By the way, the time for releasing a movie or the like in theaters differs from country to country or from area to area, and a sale of a software, i.e., information for seeing the movie by reproduction, in the form of information recording media such as optical disks and VTR tapes (hereafter referred to simply as media) is generally started when a prescribed period of time has passed after the release time of the movie so that the box-office profits of the movie are not adversely affected by the software.

Meanwhile, when a program software for a game or computer is sold in the form of optical disks such as CD-ROMs, the sales time is shifted for each area. The reason is as follows. The time required for adjusting the program software to be sold to languages or logical structures of computers on the market differs between areas or between types of computers employed.

In recent years, however, as the machinery of distribution of goods has been reorganized, even though the sales time of media is shifted from area to area, media being on sale in an area where the sale of the media has started already are available in an area where the sale of the media has not started yet. Under such circumstances, even though the media provide the same software, reproduction control to inhibit or restrict the use of the software, i.e., viewing of a movie or reproduction of a computer program, in each area has been increasingly demanded by software markers.

SUMMARY OF THE INVENTION

It is an object of the present invention to provide an information reproducing apparatus that can perform, for each area, reproduction restriction of information that is recorded on media such as optical disks and available by reproduction, thereby enabling a use of a software, such as a movie or a computer program, from a given time or within a given period of time corresponding to each area.

Another object of the present invention is to provide information recording media, such as optical disks, that can perform, for each area, reproduction restriction of information available by reproduction, thereby enabling a use of a software, such as a movie of a computer program, from a given time or within a given period of time corresponding to each area.

Other objects and advantages of the invention will become apparent from the detailed description that follows. The detailed description and specific embodiments described are provided only for illustration since various additions and modifications within the scope of the invention will be apparent to those of skill in the art from the detailed description.

According to the first aspect of the present invention, there is provided an information reproducing apparatus for reading out main information to be a target of reproduction and auxiliary information to control reproduction of the main information from an information recording medium containing the main information and the auxiliary information, and reproducing the main information according to the auxiliary information, and the apparatus comprises reproduction restricting information extracting means for extracting reproduction restricting information used for reproduction restriction of a part or the whole of the read-out main information, from the read-out auxiliary information; reproduction restriction decision means for deciding one of various modes of reproduction restriction including a mode in which reproduction restriction is not performed; and reproduction restricting means for performing reproduction restriction of a part or the whole of the read-out main information in the mode of reproduction restriction decided by the reproduction restriction decision means. Therefore, reproduction of information, which is recorded on an information recording medium such as an optical disk and available by reproduction, can be restricted in a desired mode, whereby the use of a software, such as a movie or a computer program, can be restricted.

According to a second aspect of the present invention, in the above-mentioned apparatus, the reproduction restricting information includes a plural pieces of local reproduction restricting information which correspond to plural areas defined in advance and are used for reproduction restriction in prescribed modes corresponding to the respective areas; and the reproduction restricting information extracting means is select means for selecting the local reproduction restricting means corresponding to a specified area from the plural pieces of local reproduction restricting information constituting the reproduction restricting information. Therefore, reproduction of information, which is recorded on an information recording medium such as an optical disk and available by reproduction, can be restricted for each area, whereby the use of a software, such as a movie or a computer program, can be restricted.

According to a third aspect of the present invention, in the above-mentioned apparatus, the reproduction restricting information includes time information set in advance, and the mode of reproduction restriction is decided with year/month shown by the time information as a reference; and the reproduction restriction decision means comprises clock means in which a reference time is set, and outputting time information on the basis of the reference time as the present year/month; and comparison and decision means for comparing year/month shown by the reproduction restricting information extracted by the reproduction restricting information extracting means with the present year/month output from the clock means to decide the before/after relationship between them. Therefore, the use of a software, such as a movie or a computer program, can be restricted with reference to the sales time of the software or the release time of its title.

According to a fourth aspect of the present invention, in the above-mentioned apparatus, each of the plural pieces of local reproduction restricting information provides a time in which reproduction of the main information is permitted in the corresponding area. Therefore, the available time of a software, i.e., time for starting the use of the software, can be set for each area.

According to a fifth aspect of the present invention, in the above-mentioned apparatus, the reproduction restricting information includes sales time information showing a sales time of information recording media in which the main information is recorded, in addition to the plural pieces of local reproduction restricting information; the local reproduction restricting information is inhibit period information providing, for the corresponding area, the length of a reproduction inhibit period during which reproduction of the main information is inhibited; and the reproduction restriction decision means includes adding means for calculating a time in which reproduction of the main information is permitted after the sales time, by adding the sales time shown by the sales time information and the reproduction inhibit period shown by the inhibit period information. Therefore, the time for permitting the use of a software after sale of the software can be set for each area.

According to a sixth aspect of the present invention, in the above-mentioned apparatus, each of the plural pieces of local reproduction restricting information is release time information showing a release time in which a part or the whole of the main information is released in the corresponding area; the reproduction restricting information includes plural pieces of release time information corresponding to the respective areas, and inhibit period information showing a reproduction inhibit period during which reproduction of the main information is inhibited; and the reproduction restriction decision means includes adding means for calculating a time in which reproduction of the main information is permitted after the release time, by adding the release time shown by the release time information and the reproduction inhibit period shown by the inhibit period information. Therefore, the time for permitting the use of a software after release of the software can be set for each area.

According to a seventh aspect of the present invention, in the above-mentioned apparatus, each of the plural pieces of local reproduction restricting information is reproduction permission time information showing a reproduction permission time in which reproduction of a part or the whole of the main information is permitted in the corresponding area; the reproduction restricting information includes plural pieces of reproduction permission time information corresponding to the respective areas, and permission continuing period information showing a permission continuing period during which reproduction permitted state of the main information is continued; and the reproduction restriction decision means includes adding means for calculating an end time of the reproduction permission period of the main information by adding the reproduction permission time shown by the reproduction permission time information and the permission continuing period shown by the permission continuing period information. Therefore, the time for ending the reproduction permitting period of the main information can be set for each area.

According to an eighth aspect of the present invention, the above-mentioned apparatus further comprises time setting means for setting the reference time of the clock means; and communication line control means for obtaining time information as the reference time from an external information source via a communication line. Therefore, even when the reference time of the clock circuit varies for some reason, the variation can be corrected.

According to a ninth aspect of the present invention, in the above-mentioned apparatus, the main information being a target of reproduction contains at least video information between video information and audio information; and the reproduction restricting means performs a reproduction restricting process of the video information so that the quality of a display image by the read-out video information is degraded. Therefore, the use of a software as video information can be restricted by degrading the quality of display image by the video information.

According to a tenth aspect of the present invention, there is provided an information reproducing apparatus for reading out main information being a target of reproduction and including at least one of video information and audio information and auxiliary information to control reproduction of the main information, from an information recording medium containing the main information and the auxiliary information, and reproducing the main information according to the auxiliary information, and the apparatus comprises reproduction restricting information extracting means for extracting copy restricting information used for copy restriction of a part or the whole of the read-out main information, from the read-out auxiliary information; copy restriction decision means for deciding, according to the copy restricting information, whether copy restriction of the main information is performed or not; and copy restricting means for performing copy restriction of a part or the whole of the read-out main information, according to the decision of the copy restriction decision means. Therefore, the use of a software as video or audio information can be restricted in the mode of copy guard for the video or audio information.

According to an eleventh aspect of the present invention, in the above-mentioned apparatus, wherein the copy restricting means performs, as a copy restricting process for the read-out main information, a copy guard process of disturbing normal video or audio reproduction by copy information of the main information. Therefore, it is possible to implement the restriction on the use of a software in the mode of copy guard of the video or audio information, by a simple structure. For example, the copy restricting process can be realized using an existing circuit structure for superimposing a copy guard signal on the read-out information.

According to a twelfth embodiment of the present invention, in the above-mentioned apparatus, the main information being a target of reproduction includes, as at least video information between video information and audio information, plural pieces of channel video information corresponding to plural channels; the reproduction restricting information includes video reproduction restricting information comprising plural pieces of channel reproduction restricting information corresponding to the respective channels and used for restricting reproduction of the channel video information; the apparatus further includes channel selecting means for selecting a desired channel from the plural channels in response to a control signal from the outside; and on the basis of the channel reproduction restricting information corresponding to the selected channel, reproduction restriction is performed to the channel video information corresponding to the selected channel. Therefore, reproduction of the plural pieces of video information corresponding to the respective channels can be restricted channel by channel, whereby the use of a software relating to video information can be restricted accurately.

According to a thirteenth aspect of the present invention, in the above-mentioned apparatus, each of the plural pieces of channel reproduction restricting information corresponding to the respective channels comprises plural pieces of local reproduction restricting information which respectively correspond to plural areas defined in advance and are used for performing the reproduction restriction in prescribed modes corresponding to the respective areas; the reproduction restricting information extracting means selects the local reproduction restricting information corresponding to a specified area from the plural pieces of local reproduction restricting information constituting the plural pieces of channel reproduction restricting information; and reproduction restriction of the channel video information corresponding to the selected channel is performed on the basis of the selected local reproduction restricting information. Therefore, reproduction of the plural pieces of video information corresponding to the respective channels can be restricted channel by channel, whereby the use of a software relating to video information can be restricted with higher accuracy.

According to a fourteenth aspect of the present invention, in the above-mentioned apparatus, the main information being a target of reproduction includes video information, sub-picture information, and audio information of a movie, and the sub-picture information includes a plural pieces of sub-picture information of different translation languages corresponding to plural channels; the reproduction restricting information includes sub-picture reproduction restricting information used for performing reproduction restriction of the plural pieces of sub-picture information of different translation languages, and the sub-picture reproduction restricting information comprises plural pieces of channel reproduction restricting information corresponding to plural channels, and each of the plural pieces of channel reproduction restricting information comprises plural pieces of local reproduction restricting information for performing the reproduction restriction in prescribed modes corresponding to the respective areas; the apparatus further includes channel selecting means for selecting a desired channel from the plural channels in response to a control signal from the outside; the reproduction restricting information extracting means selects the local reproduction restricting information corresponding to a specified area from the plural pieces of local reproduction restricting information constituting the channel reproduction restricting information; and reproduction restriction is performed to the sub-picture information corresponding to the selected channel on the basis of the local reproduction restricting information selected from the plural pieces of local reproduction restricting information constituting the channel reproduction restricting information corresponding to the selected channel. Therefore, the use of a software, such as a movie, can be restricted by restricting reproduction of the sub-picture information. Furthermore, reproduction of the plural pieces of sub-picture information corresponding to the respective channels can be restricted channel by channel and area by area, whereby the use of the software can be restricted with higher accuracy.

According to a fifteenth aspect of the present invention, in the above-mentioned apparatus, the main information being a target of reproduction contains at least audio information between video information and audio information; and the reproduction restricting means performs a reproduction restricting process of the audio information so that the quality of reproduced sound by the read-out audio information is degraded. Therefore, the use of a software as audio information can be restricted by degrading the tone quality of reproduced sound.

According to a sixteenth aspect of the present invention, in the above-mentioned apparatus, the main information being a target of reproduction contains, as at least audio information between video information and audio information, plural pieces of channel audio information corresponding to plural channels; the reproduction restricting information includes audio reproduction restricting information comprising plural pieces of channel reproduction restricting information corresponding to the respective channels, used for performing reproduction restriction to the channel audio information; the apparatus further includes channel selecting means for selecting a desired channel from the plural channels in response to a control signal from the outside; and on the basis of the channel reproduction restricting information corresponding to the selected channel, reproduction restriction is performed to the channel video information corresponding to the selected channel. Therefore, reproduction of the plural pieces of audio signals corresponding to the respective channels can be restricted channel by channel, whereby the use of a software relating to audio information can be restricted accurately.

According to a seventeenth aspect of the present invention, in the above-mentioned apparatus, each of the plural pieces of channel reproduction restricting information corresponding to the respective channels comprises plural pieces of local reproduction restricting information which respectively correspond to plural areas defined in advance and are used for performing the reproduction restriction in prescribed modes corresponding to the respective areas; the reproduction restricting information extracting means selects the local reproduction restricting information corresponding to a specified area from the plural pieces of local reproduction restricting information constituting the channel reproduction restricting information; and reproduction restriction of the channel audio information corresponding to the selected channel is performed on the basis of the selected local reproduction restricting information. Therefore, reproduction of the plural pieces of audio information corresponding to the respective channels can be restricted channel by channel and area by area, whereby the use of the software relating to audio information can be restricted with higher accuracy.

According to an eighteenth aspect of the present invention, in the above-mentioned apparatus, the main information being a target of reproduction includes at least one of video information and audio information; and the reproduction restricting means performs, as a reproduction restricting process of the main information, a process of stopping reproduction of a part or the whole of at least one of read-out video information and read-out audio information. Therefore, the use of a software relating to video information or audio information can be restricted by inhibiting display of the video information or by inhibiting reproduction of the audio information.

According to a nineteenth aspect of the present invention, in the above-mentioned apparatus, the main information being a target of reproduction includes at least one of video information and audio information which are compressively encoded and recorded on an information recording medium. Therefore, reproduction of information, which is compressively encoded and recorded on an information recording medium such as an optical disk and available by reproduction, can be restricted in a desired mode, whereby the use of compressively encoded and recorded information, relating to a movie or a computer program, can be restricted.

According to a twentieth aspect of the present invention, the above-mentioned apparatus further comprises reproduction control means for controlling reproduction of the read-out main information; and a display unit having an display screen and displaying video information included in the main information on the screen; wherein the reproduction control means has a message storage unit in which plural pieces of message information for explaining various modes of reproduction restriction are stored, and controls the display unit so that, when reproduction restriction of the main information is being carried out, message information corresponding to the mode of the reproduction restriction is displayed on the screen of the display unit. Therefore, when reproduction of video information is restricted during the reproduction of the video information, the user can know the content of the restriction.

According to a twenty-first aspect of the present invention, there is provided an information recording medium on which main information to be a target of reproduction and auxiliary information for controlling reproduction of the main information are recorded, wherein the auxiliary information includes reproduction restricting information for performing reproduction restriction of a part or the whole of the main information. Therefore, reproduction of information, which is recorded on an information recording medium such as an optical disk and available by reproduction, can be restricted in a desired mode, whereby the use of a software, such as a movie or a computer program, can be restricted.

According to a twenty-second aspect of the present invention, in the above-mentioned medium, the reproduction restricting information includes plural pieces of local reproduction restricting information which respectively correspond to plural areas defined in advance and are used for performing the reproduction restriction in prescribed modes corresponding to the respective areas. Therefore, reproduction of information, which is recorded on an information recording medium such as an optical disk and available by reproduction, can be restricted for each area, whereby the use of a software, such as a movie or a computer program, can be restricted for each area.

According to a twenty-third aspect of the present invention, in the above-mentioned medium, the reproduction restricting information is reproduction restricting time information including at least one of three pieces of time information, i.e., a time in which the reproduction restriction is started, a time in which the reproduction restriction is ended, and a period during which the reproduction restriction is carried out. Therefore, reproduction of the recorded information available by reproduction can be inhibited or permitted with a prescribed period as a reference or by defining a prescribed period.

According to a twenty-fourth aspect of the present invention, in the above-mentioned medium, the local reproduction restricting information defines, for the corresponding area, a time in which reproduction of the main information is permitted. Therefore, the time for starting the use of a software can be set for each area.

According to a twenty-fifth aspect of the present invention, in the above-mentioned medium, the reproduction restricting information includes sales time information showing a sales time in which sale of the main information is started, in addition to the plural pieces of local reproduction restricting information; and each of the plural pieces of local reproduction restricting information is inhibit period information providing, for the corresponding area, the length of a reproduction inhibit period during which reproduction of the main information is inhibited. Therefore, the time for permitting the use of a software after sale of the software can be set for each area.

According to a twenty-sixth aspect of the present invention, in the above-mentioned medium, each of the plural pieces of local reproduction restricting information is release time information showing a release time in which a part or the whole of the main information is released in the corresponding area; and the reproduction restricting information includes plural pieces of release time information corresponding to the respective areas, and inhibit period information showing a reproduction inhibit period during which reproduction of the main information is inhibited from the release time. Therefore, the time for permitting the use of a software after release of the software can be set for each area.

According to a twenty-seventh aspect of the present invention, in the above-mentioned medium, each of the plural pieces of local reproduction restricting information is reproduction permission time information showing a reproduction permission time in which reproduction of a part or the whole of the main information is permitted in the corresponding area; and the reproduction restricting information includes plural pieces of reproduction permission time information corresponding to the respective areas, and permission continuing period information showing the length of a permission continuing period during which reproduction permitted state of the main information is continued. Therefore, the time for ending the reproduction permitting period of the main information can be set for each area.

According to a twenty-eighth aspect of the present invention, in the above-mentioned medium, the main information being a target of reproduction includes at least one of video information and audio information. Therefore, the use of a software relating to video information or audio information can be restricted by inhibiting display of the video information or by inhibiting reproduction of the audio information.

According to a twenty-ninth aspect of the present invention, in the above-mentioned medium, the main information being a target of reproduction includes at least one of video information and audio information which are compressively encoded and recorded. Therefore, reproduction of compressively encoded and recorded information available by reproduction can be restricted in a desired mode, whereby the use of compressively encoded and reproduced information relating to a movie or a computer program can be restricted.

According to a thirtieth aspect of the present invention, in the above-mentioned medium, the main information being a target of reproduction includes, as at least video information between video information and audio information, plural pieces of channel video information corresponding to plural channels; and the reproduction restricting information includes video reproduction restricting information for performing reproduction restriction of the video information, and the video reproduction restricting information comprises plural pieces of channel reproduction restricting information corresponding to plural channels, and each of the plural pieces of channel reproduction restricting information comprises plural pieces of local reproduction restricting information which respectively correspond to plural areas defined in advance and are used for performing the reproduction restriction in prescribed modes corresponding to the respective areas. Therefore, reproduction of the plural pieces of video information corresponding to the respective channels can be restricted channel by channel and area by area, whereby the use of a software relating to video information can be restricted with higher accuracy.

According to a thirty-first aspect of the present invention, in the above-mentioned medium, the main information being a target of reproduction includes, as at least audio information between video information and audio information, plural pieces of channel audio information corresponding to plural channels; and the reproduction restricting information includes audio reproduction restricting information for performing reproduction restriction of the audio information, and the audio reproduction restricting information comprises plural pieces of channel reproduction restricting information corresponding to plural channels, and each of the plural pieces of channel reproduction restricting information comprises plural pieces of local reproduction restricting information which respectively correspond to plural areas defined in advance and are used for performing the reproduction restriction in prescribed modes corresponding to the respective areas. Therefore, reproduction of the plural pieces of audio information corresponding to the respective channels can be restricted channel by channel and area by area, whereby the use of a software relating to audio information can be restricted with higher accuracy.

BRIEF DESCRIPTION OF THE DRAWINGS

FIG. 4 is a diagram illustrating area codes included in the auxiliary information.

FIGS. 6($a$) and 6($b$) are diagrams illustrating a format of auxiliary information recorded on an optical disk used in the apparatus according to the second embodiment.

DETAILED DESCRIPTION OF THE PREFERRED EMBODIMENTS

[Embodiment 1]

Figure 1:
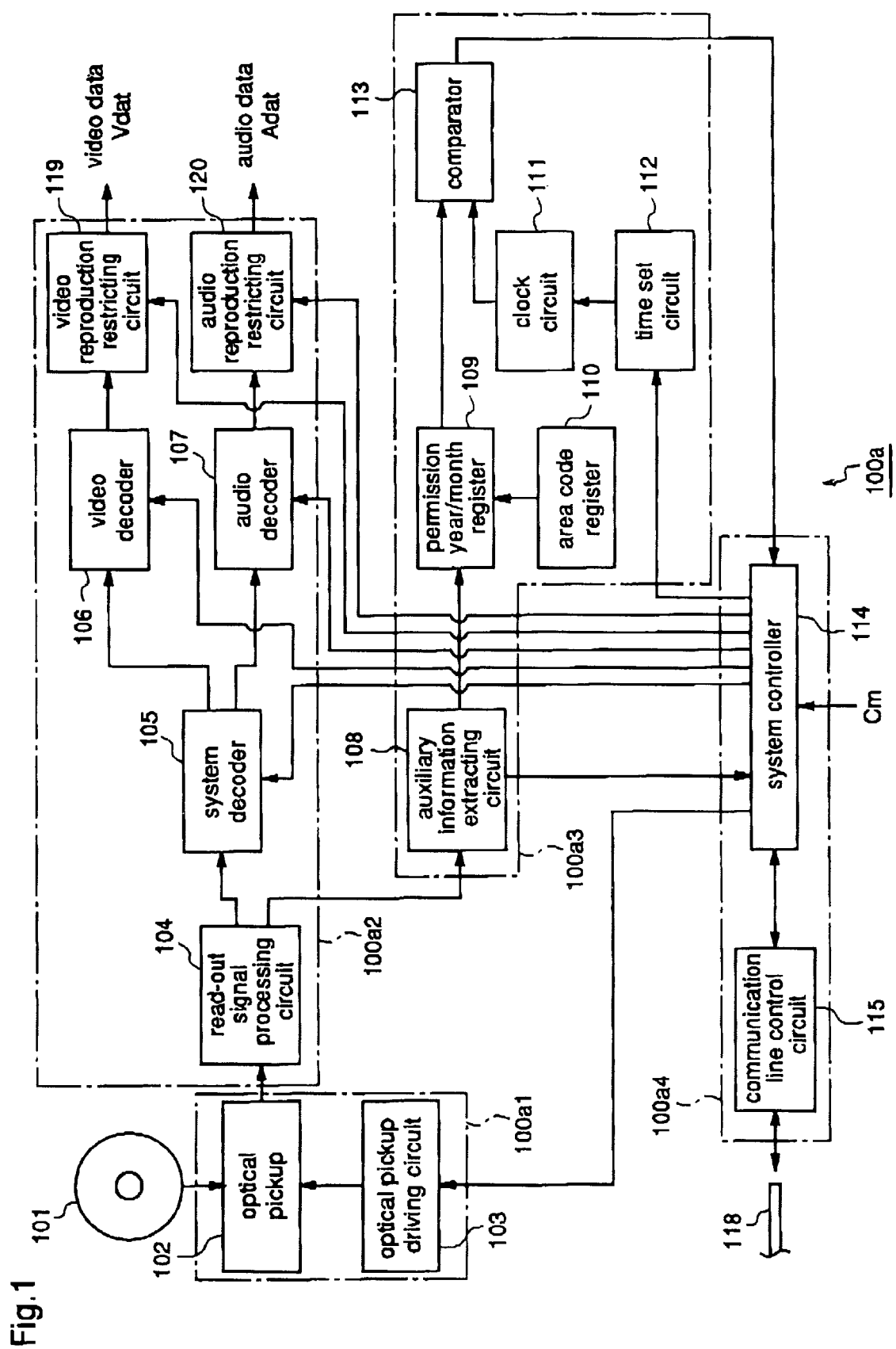
FIG. 1 is a block diagram illustrating an information decoding and reproducing apparatus according to a first embodiment of the invention.

FIG. 1 is a block diagram illustrating an information decoding and reproducing apparatus according to a first embodiment of the present invention.

In FIG. 1, an optical disk 101 contains main information to be an object of reproduction, and auxiliary information for controlling reproduction of the main information. An information decoding and reproducing apparatus 100$a$ reads the main information and the auxiliary information from the optical disk 101 and reproduces the main information according to the auxiliary information by decoding. It is assumed that the main information comprises compressively encoded video information and audio information. Although in this first embodiment the main information recorded on the optical disk 101 has been compressively encoded, video information and audio information may be recorded as digital data without being subjected to compressive encoding.

The information decoding and reproducing apparatus 100$a$ is equipped with the following units: an information read unit 101$a$1 for reading information recorded in the optical disk 101; a signal reproduction unit 100$a$2 for separating the main information and the auxiliary information from the read information and reproducing video data $V_{dat}$ and audio data $A_{dat}$ by performing decoding to the main information; an auxiliary information processing unit 100$a$3 for dividing the auxiliary information into reproduction restricting information used for restricting reproduction of a part or the whole of the main information and the other auxiliary information, and performing a desired signal processing to the reproduction restricting information; and a control unit 100$a$4 for controlling the above-mentioned units according to the reproduction restricting information, the other auxiliary information, and control signals from the outside.

The information decoding and reproducing apparatus 100$a$ further includes a display unit for displaying the video data $V_{dat}$ on a display screen and a voice generating unit to which the audio data $A_{dat}$ is input.

The information read unit 100a1 comprises an optical pickup 102 for reading information recorded in the optical disk 101, and an optical pickup driving circuit for driving the optical pickup 102 according to a control signal from the control unit 100a4. The optical pickup 102 irradiates the optical disk 101 with an optical beam, such as a laser beam, receives light reflected by the optical disk 101, and converts the reflected light to an electric signal.

The signal reproduction unit 100a2 comprises a read-out signal processing circuit 104 for performing binarization, digital demodulation, error detection and the like to the information read from the optical disk 101 by the optical pickup 102, and a system decoder 105 for separating a video stream and an audio stream from a system multiplexed bit stream output from the read-out signal processing circuit 104 (i.e., an encoded signal of the main information) according to a control signal from the control unit 100a4.

The read-out signal processing circuit 104 outputs the main information utilized as a software (video information and audio information) separately from the auxiliary information other than the main information. Further, in the MPEG standard (ISO/IEC 13818-1), a so-called program stream is input to the system decoder 105 as the main information. This program stream is a mixture of a video packet and an audio packet. The video packet is provided by dividing a video stream obtained by compress encoding of video data into plural sub-streams of uniform intervals and giving a header to the head of each sub-stream, and the audio packet is provided by dividing an audio stream obtained by compress encoding of audio data into plural sub-streams of uniform intervals and giving a header to the head of each sub-stream. The header information of each packet includes information of the kind of the packet, i.e., whether the packet is a video packet or an audio packet, and time information for synchronizing an audio signal with a video signal. Accordingly, the system decoder 105 divides the program stream into the video stream and the audio stream on the basis of the head information.

Further, the signal reproduction unit 100a2 comprises a video decoder 106 for decoding the video stream from the system decoder 105 according to a control signal from the control unit 100a4, an audio decoder 107 for decoding the audio stream from the system decoder 105 according to a control signal from the control unit 100a4, a video reproduction restricting circuit 119 for performing a video reproduction restricting process to an output from the video decoder 106 according to a control signal from the control unit 100a4 and outputting video data, and an audio reproduction restricting circuit 120 for performing an audio reproduction restricting process to an output from the audio decoder 107 according to a control signal from the control unit 100a4 and outputting audio data.

In this first embodiment, when the present year and month (hereinafter, referred to as year/month) has not passed reproduction permitting year/month, in both of the reproduction restricting circuits 119 and 120, decoded data from the decoders 106 and 107 are restricted in reproduction. That is, when the video reproduction restricting circuit 119 restricts reproduction of the decoded video data from the video decoder 106, the circuit 119 processes the decoded video data so that its display image is disordered and outputs the data as $V_{dat}$. When no restriction is given to reproduction of the decoded video data from the video decoder 106, the circuit 119 outputs the decoded video data as it is. When the audio reproduction restricting circuit 120 restricts reproduction of the decoded audio data from the audio decoder 107, the circuit 120 superimposes noise on the decoded audio data and outputs the data as $A_{dat}$. When no restriction is given to reproduction of the decoded audio data from the audio decoder 107, the circuit 120 outputs the decoded audio data as it is.

The auxiliary information processing unit 100a3 comprises an auxiliary information extracting circuit 108 for outputting permission year/month information in the auxiliary information, separately from the other auxiliary information. The permission year/month information gives the time to permit reproduction of the video data and the audio data, and this information is set individually for each of different areas being sales targets of the software. The auxiliary information processing unit 100a3 further comprises an area code register 110 in which an area code corresponding to a specific area among the above-mentioned target areas is set in advance, and a permission year/month register 109 for selecting permission year/month information corresponding to the area set in the area code register 110 from plural pieces of permission year/month information set for the respective areas, and storing the selected permission year/month information. Furthermore, the auxiliary information processing unit 100a3 comprises a clock circuit 111 for measuring an elapsed time from a reference time, a time set circuit 112 for setting the reference time of the clock circuit 111 on the basis of a control signal from the control unit 100a4, and a comparator 113 for receiving an output from the clock circuit 111 and an output from the permission year/month register 109, and comparing the present year/month with the permission year/month.

The control unit 100a4 comprises a system controller 114 for outputting control signals to the optical pickup driving circuit 103, the decoders 105~107, the reproduction restricting circuits 119 and 120, and the time set circuit 112 according to an output from the comparator 113, auxiliary information other than the permission year/month information, extracted by the auxiliary information extracting circuit 108, and a control signal Cm from the outside. The control unit 100a4 further comprises a communication line control circuit 115 for controlling communication between the system controller 114 and other information processing apparatus via a communication line 118.

Furthermore, since the clock circuit 111 outputs time information serving as a reference to decide whether reproduction is permitted or inhibited, the clock circuit 111 must be constructed so that the user cannot set the reference time freely. So, it is desired to make adjustment of the reference time of the clock circuit 111 unnecessary after setting of the reference time at the shipment of the information decoding and reproducing apparatus 100a from the factory.

For this purpose, in this first embodiment of the invention, a sufficient accuracy in practical use is given to the clock circuit 111, and the lifetime of a battery driving the clock circuit 111 is sufficiently increased by, for example, charging the battery when the information decoding and reproducing apparatus 100a is operated. Therefore, usually, setting the time of the clock circuit 111 is not necessary.

However, when the time of the clock circuit 111 varies for some reason, it must be reset to a correct time.

So, in the information decoding and reproducing apparatus according to the first embodiment, when the time of the clock circuit 111 varies, the reference time of the clock circuit 111 is corrected by a command from the system controller 114. More specifically, when the time of the clock circuit 111 varies, the communication line control circuit 115 makes a telephone call to a prescribed service center via the communication line 118 and, after a simple procedure for authentication, the system controller 114 receives information of the correct time (present time) from the service center and sends the time information to the time set circuit 112. Then, the time set circuit 112 sets the reference time of the clock circuit 111 to the correct time.

Next, a description is given of a recording format of the optical disk 101 employed in the information decoding and reproducing apparatus 100a according to the first embodiment.

FIGS. 2(a)–2(d) are diagrams for explaining the optical disk 101 in which information to be reproduced by the information decoding and reproducing apparatus 100a is recorded, schematically showing an example of a data structure of information recorded in the optical disk 111.

Figure 2:
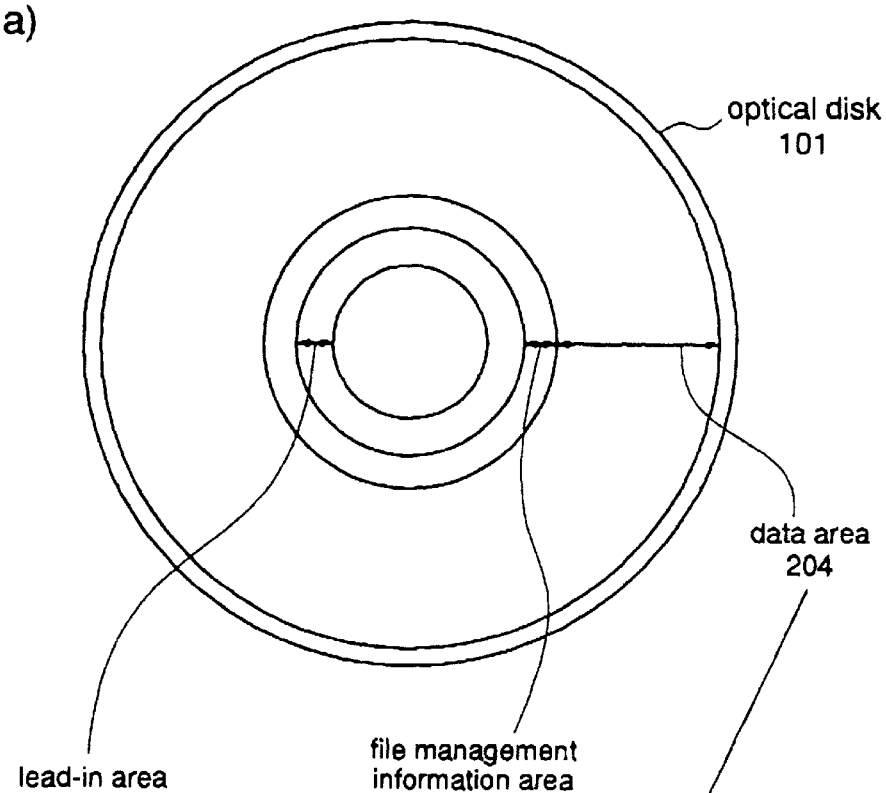
FIGS. 2($a$)–2($d$) are diagrams illustrating a format of data recorded on an optical disk used in the apparatus according to the first embodiment.
Figure 2:
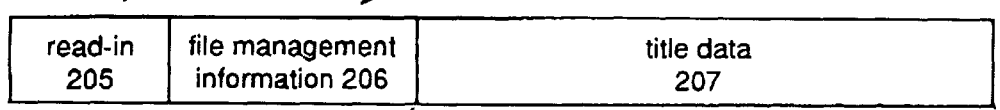
Figure 2:
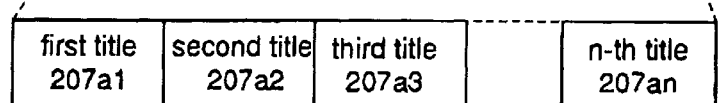
Figure 2:
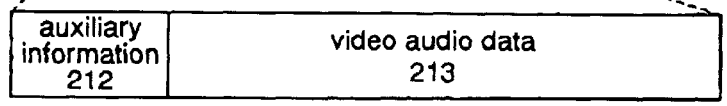

Data (information) is recorded on a spiral recording track formed on the optical disk 101. On the recording track, as shown in FIG. 2(a), a lead-in area 202, a file management information area 203, and a data area 204 are set in this order from the inner circumference to the outer circumference of the optical disk 101. FIGS. 2(b)–2(d) show arrangements of the respective areas on the recording track along the radius direction of the optical disk 101. When the optical disk of this structure is rotated by a motor, an optical head of the optical pickup 102 for reading the recorded information moves relatively to the recording track, whereby the information recorded on the recording track is successively read by the optical head. At this time, in case of normal reproduction, the moving direction of the optical head relative to the optical disk is a direction from the left to the right across the respective areas of the optical disk shown in FIGS. 2(b)–2(d).

As shown in FIG. 2(b), lead-in information 205 is recorded in the lead-in area 202, file management information 206 is recorded in the file management information area 203, and title data 207 is recorded in the data area 204. As shown in FIG. 2(c), the title data 207 comprises n pieces of titles, from the first title $207a_1$ to the n-th title $207a_n$. As shown in FIG. 2(d), each title comprises auxiliary information 212 and encoded video and audio data (main information) 213. The file management information 206 contains positions of the auxiliary information 212 and the encoded video and audio data 213 on the optical disk. In the read-out signal processing circuit 104, on the basis of this information 206, the read information is distributed so that the auxiliary information is output to the auxiliary information extracting circuit 108 while the encoded video and audio data 213, i.e., the main information, is output to the system decoder 105.

The encoded video and audio data 213 is a system stream obtained by compressively encoding video data using a method defined by, for example, the MPEG2 video standard (ISO/IEC 13818-2) while compressively encoding audio data using a method defined by, for example, the MPEG2 audio standard (ISO/IEC 13818-3), and multiplexing the encoded video data and audio data according to the MPEG 2 system standard (ISO/IEC 13818-1).

Figure 3:
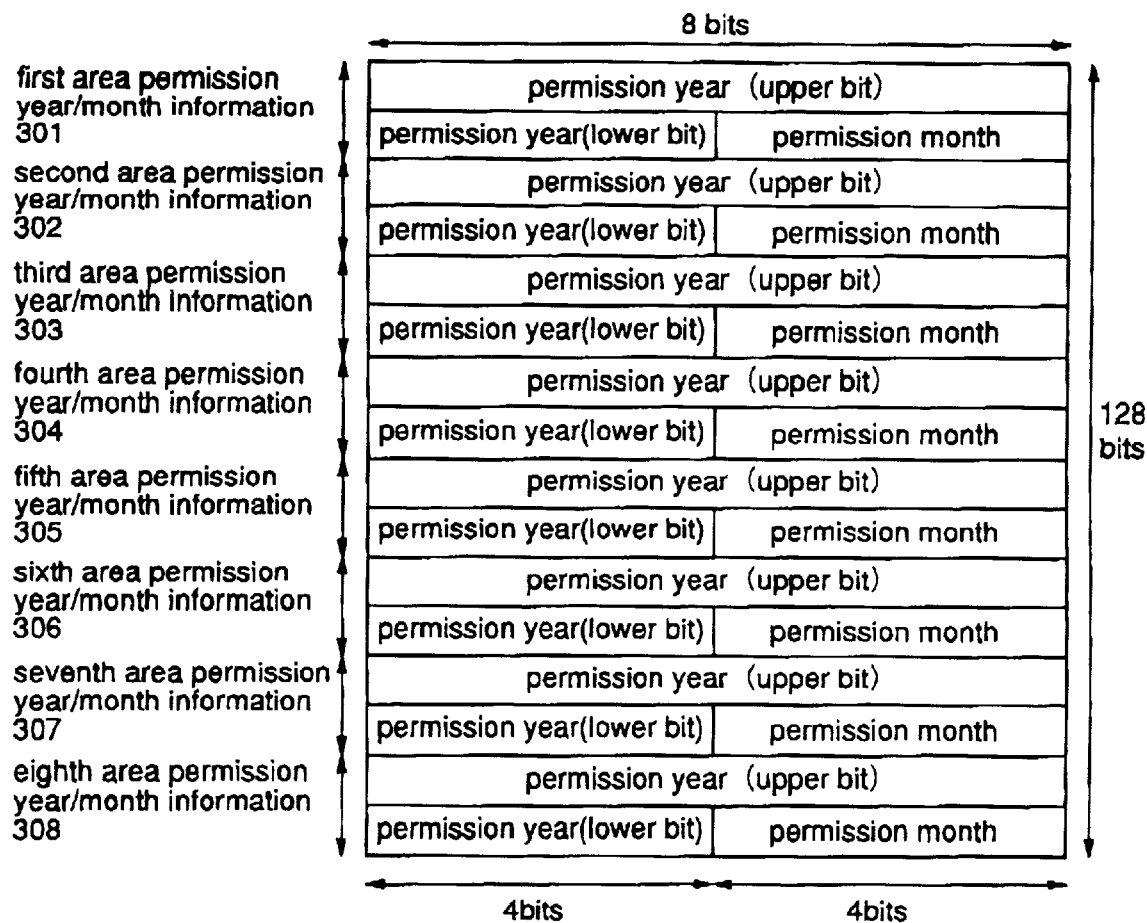
FIGS. 3($a$) and 3($b$) are diagrams illustrating a format of auxiliary information recorded on the optical disk according to the first embodiment.

Further, the auxiliary information 212 is used for various controls of the respective units in the information decoding and reproducing apparatus and, generally, the auxiliary information comprises information showing the reproduction order in each title, information of jump address used for special reproduction, and information relating to copyright protection. In this first embodiment, as one of the auxiliary information, year/month in which reproduction of each title for viewing is permitted is recorded. The year/month information for permitting reproduction of each title indicates that reproduction of the title is not permitted until the present year/month has reached a specified year/month, and this corresponds to the above-mentioned permitting year/month information. Further, as shown in FIG. 3(a), the permission year/month information comprises eight pieces of permission year/month information 301 to 308 respectively corresponding to the first to eighth areas. In this first embodiment, descriptions of the information defining the reproduction order in each title, the information required for special reproduction, and the information for protecting copyright are omitted.

FIG. 3(a) shows an example of permission year/month information in the auxiliary information 212, wherein 16 bits are given to each of the permission year/month information 301 to 308 corresponding to the first to eighth areas, so that the whole permission year/month information is represented by 128 bits in total. That is, for each area, the reproduction permitting year (permission year) is represented by 12 bits, and the reproduction permitting month (permission month) is represented by 4 bits. According to such assignment of bits, there are 4096 ways of setting the permission year. Therefore, the permission year is represented by any year from A.D.0 to A.D.4096 or any year from A.D.1900 to A.D.5996 with an offset of A.D.1900. In case of giving an offset of A.D.1900 at A.D.0, '1900' is added as an offset value to the permission year/month information when the permission year/month register 109 outputs the permission year/month information to the comparator 113.

Further, in the above-mentioned auxiliary information 212, determined is from which byte the table of the permission year/month information shown in FIG. 3(a) starts with the head bit of the auxiliary information as a reference. Hence, in the auxiliary information extracting circuit 108, the permission year/month information can be extracted from the input auxiliary information.

Furthermore, since the permission month is represented by 4 bits, there are 16 ways of setting the permission month. For example, as shown in FIG. 3(b), using code value '0001'~'1100', twelve months, from January to December, are represented corresponding to the respective code values. Further, the following definitions are possible using code values which are not used for representation of the months. That is, code value '0000' shows "no reproduction inhibit period", and code value '1111' shows "permanent inhibit of reproduction".

In this case, when the 'month' part of the permission year/month information output from the permission year/month register 109 takes any of the code values '0001'~'1100', in the comparator 113 of the information decoding and reproducing apparatus 100a, the 'month' value shown by the code value is compared with a 'month' value shown by the output of the clock circuit 111, and a high level signal (hereinafter referred to as 'High') or a low level signal (hereinafter referred to as 'Low') is output according to the result of the comparison. When the 'month' part of the permission year/month information takes the code value '0000', 'Low' is always output regardless of the output of the clock circuit 111. When the 'month' part of the permission year/month information takes the code value '1111', 'High' is always output.

FIG. 4 shows a table of area codes. In this table, area codes '1' to '8' show the first to eighth areas, respectively, and the first to fifth areas are defined corresponding to specific areas on the earth. One of the area codes '1' to '5' is set in the area code register 110 of the apparatus 100a shown in FIG. 1, according to the destination area of the apparatus, at the shipping from the factory. That is, the user cannot change the area code freely.

Next, a description is given of the operation of the information decoding and reproducing apparatus 100a.

When the optical disk 101 is rotated and the optical pickup 102 is driven, information recorded on the optical disk 101 is read by the optical pickup 102, and the read information signal is sent to the reproduction signal processing circuit 104. In the red-out signal processing circuit 104, the information signal is subjected to binarization, digital demodulation, error correction, and the like. Further, on the basis of the file management information 206, the information is divided and distributed so that the auxiliary information is output to the auxiliary information extracting circuit 108 while the main information, i.e., the encoded video and audio data 213, is output to the system decoder 105 as a program stream.

In the system decoder 105, according to a control signal from the system controller 114, a video stream corresponding to the video data and an audio stream corresponding to the audio data are separated from the input program stream and extracted individually, and the video stream is output to the video decoder 106 while the audio stream is output to the audio decoder 107. At this time, the separation of the video and audio streams from the program stream is carried out according to the MPEG2 system standard (ISO/IEC 13818-1).

In the video decoder 106, decoding of the input video stream is carried out according to the MPEG2 video standard (ISO/IEC 13818-2), and decoded video data is output from the video decoder 106 to the video reproduction restricting circuit 119. In the audio decoder 107, decoding of the input audio stream is carried out according to the MPEG2 audio standard (ISO/IEC 13818-3), and decoded audio data is output from the audio decoder 107 to the audio reproduction restricting circuit 120.

On the other hand, the auxiliary information output form the read-out signal processing circuit 104 is input to the auxiliary information extracting circuit 108. In the auxiliary information extracting circuit 108, the permission year/month information is extracted from the auxiliary information and output to the permission year/month register 109 while the other auxiliary information is output to the system controller 114. In the system controller 114, the auxiliary information is used for various controls as desired.

In the permission year/month register 109, from the plural pieces of input permission year/month information corresponding to the respective areas, the permission year/month information of an area specified by the area code register 110 is selected and stored. For example, for an apparatus shipped to Japan, since the area cod '2' is set in the area code register 110, the permission year/month register 109 receives the area code '2', selects the permission year/month information 302 of the second area from the eight pieces of permission year/month information corresponding to the first to eighth areas, and stores the information 302. The value stored in the permission year/month register 109 is supplied to the comparator 113, wherein it is compared with the value output from the clock circuit 111.

More specifically, the clock circuit 111 outputs the present year, month, and date information, in addition to the present time information (o'clock, minute, second), and the 'year' and 'month' information is input to the comparator 113. In the comparator 113, the year/month information from the permission year/month register 109 is compared with the year/month information form the clock circuit 111. When the year/month shown by the output of the clock circuit 111 is smaller than the year/month shown by the output of the permission year/month register 109, 'High' is output from the comparator 113 to the system controller 114. On the other hand, when the year/month shown by the output of the clock circuit 111 is equal to or larger than the year/month shown by the output of the permission year/month register 109, 'Low' is output from the comparator 113 to the system controller 114.

Since the fact that the signal output from the comparator 113 is 'High' means that the present year/month has not reached the reproduction permitting year/month, the system controller 114 controls the reproduction restricting circuits 119 and 120 so that a reproduction inhibit process is performed in these circuits. Conversely, since the fact that the signal output form the comparator 113 is 'Low' means that the present year/month has reached the reproduction permitting year/month, the system controller 114 controls the circuits 119 and 120 so that a reproduction permitting process is performed in these circuits.

More specifically, in the reproduction restricting circuits 119 and 120, according to the control signals from the system controller 114, decoded data from the decoders 106 and 107 are subjected to, or not subjected to, restriction in reproduction, and output as video data $V_{dat}$ and audio data $A_{dat}$, respectively.

During the operation mentioned above, the reference time of the clock circuit 111 is corrected as follows. When the clock circuit 111 gets out to fix for some reason, in response to a command from the system controller 114, the communication line control circuit 115 makes a telephone call to a prescribed service center via the communication line 118 and, after a simple procedure of authentication, the system controller 114 receives the time information. Then, the system controller 114 sends the time information to the time set circuit 112, and the time set circuit 112 sets the time of the clock circuit 111 to the correct time.

As described above, according to the first embodiment of the invention, the information decoding and reproducing apparatus is provided with the auxiliary information extracting circuit 108 for extracting, from information read from the optical disk 101, plural pieces of permission year/month information respectively set for different areas, together with the other auxiliary information; the area code register 110 in which an area code corresponding to a sales area of the apparatus (information decoding and reproducing apparatus) is set when the apparatus is shipped form the factory; and the permission year/month register 109 for selecting the permission year/month information corresponding to the area code set in the area code register 110 from the extracted permission year/month information corresponding to the respective areas. In this apparatus, according to whether or not the present year/month is before the year/month defined by the permission year/month information of the area selected, reproduction of the video and audio data included in the information read from the optical disk is restricted. Therefore, reproduction of video and audio data recorded on media, such as optical disks, can be restricted for each area, whereby the use of a software, such as a movie, can be permitted according to the sales time in each area.

In the first embodiment of the invention, to inhibit reproduction of video and audio data, in the video reproduction restricting circuit 119, the decoded video data from the video decoder 106 is processed so that its display image is disordered. In the audio reproduction restricting circuit 120, noise is superimposed on the decoded audio data from the audio decoder 107. However, the reproduction inhibit process is not restricted thereto.

For example, a reproduction inhibit process by the system controller 114 is to stop the operation of the system decoder 105 so that no data is supplied to the video decoder 106 and the audio decoder 107. In this case, in the video reproduction restricting circuit 119, the signal from the video decoder 106 is cut off and, using an internal ODS (On Screen Display) function (not shown), a sub-picture (caption) showing that reproduction is inhibited is displayed on the screen of the display unit.

The OSD function possessed by the video reproduction restricting circuit 119 is to superimpose characters and the like on the screen, and there are three specific circuit structures to implement the OSD function.

In the first circuit structure of the OSD function, a position on the display screen where sub-picture information is to be displayed, and character codes as the sub-picture information are specified from the outside, a character pattern corresponding to the specified position and character codes is generated, and the character pattern is superimposed on the video data output to the display unit. The second circuit structure of the OSD function employs a frame memory, and a bit pattern corresponding to sub-picture information generated outside is written in the frame memory. The bit pattern in the frame memory is read synchronously with the video signal while superimposing the bit pattern on the video data output to the display unit. Further, the third circuit structure of the OSD function employs a frame memory (output frame memory) in the video decoder, and a bit pattern corresponding to sub-picture information generated outside is written directly in the frame memory. When the video data is output, the bit pattern is read out together with the video data.

A video image used for the display to show that reproduction is inhibited has been compressively encoded and stored as a video stream in the system controller 114 in advance and, when reproduction is inhibited, the compressed video stream is input to the video decoder 106. Further, the system controller 114 may be provided with a message memory (not shown) containing message information for explaining the content of restriction on the video and audio data reproduction, as a corresponding bit stream. When restriction of the video and audio data reproduction is performed, message information corresponding to the content of the restriction is output from the video reproduction restricting circuit 119 together with the video data, and the content of the restriction is displayed on the screen of the display unit. A specific structure to display the sub-picture will be described in more detail for the sixth embodiment of the invention.

Further, the process of restricting reproduction of video data by the video reproduction restricting circuit 119 is not restricted to the above-mentioned one, i.e., to process the video data so that the video image on the screen is disordered. Another process of restricting reproduction of video data by the video reproduction restricting circuit 119 is to degrade the image quality by reducing the bit number of the output signal from the video decoder 106, adding noise, or disordering a portion of the video image. Further, it is possible to substantially disturb the appreciation by masking or disordering the output signal from the video decoder at regular or irregular intervals.

Furthermore, the process of restricting reproduction of audio data is not restricted to those mentioned above, i.e., to degrade the tone quality by missing noise and to stop the decoding process. Like in the case of video data, the appreciation may be disturbed by interrupting the output signal form the audio decoder 107 timewise.

Moreover, in this first embodiment, to restrict reproduction of the decoded video data from the video decoder 106, the video reproduction restricting circuit 119 processes the decoded video data so that the display image is disordered and outputs the data as the video data $V_{dat}$. When reproduction of the decoded video data is not restricted, the video reproduction restricting circuit 119 outputs the decoded video data as the video data $V_{dat}$. However, the video reproduction restricting circuit 119 may superimpose a copy guard signal on the decoded video data whether the reproduction restriction is performed or not.

[Embodiment 2]

Figure 5:
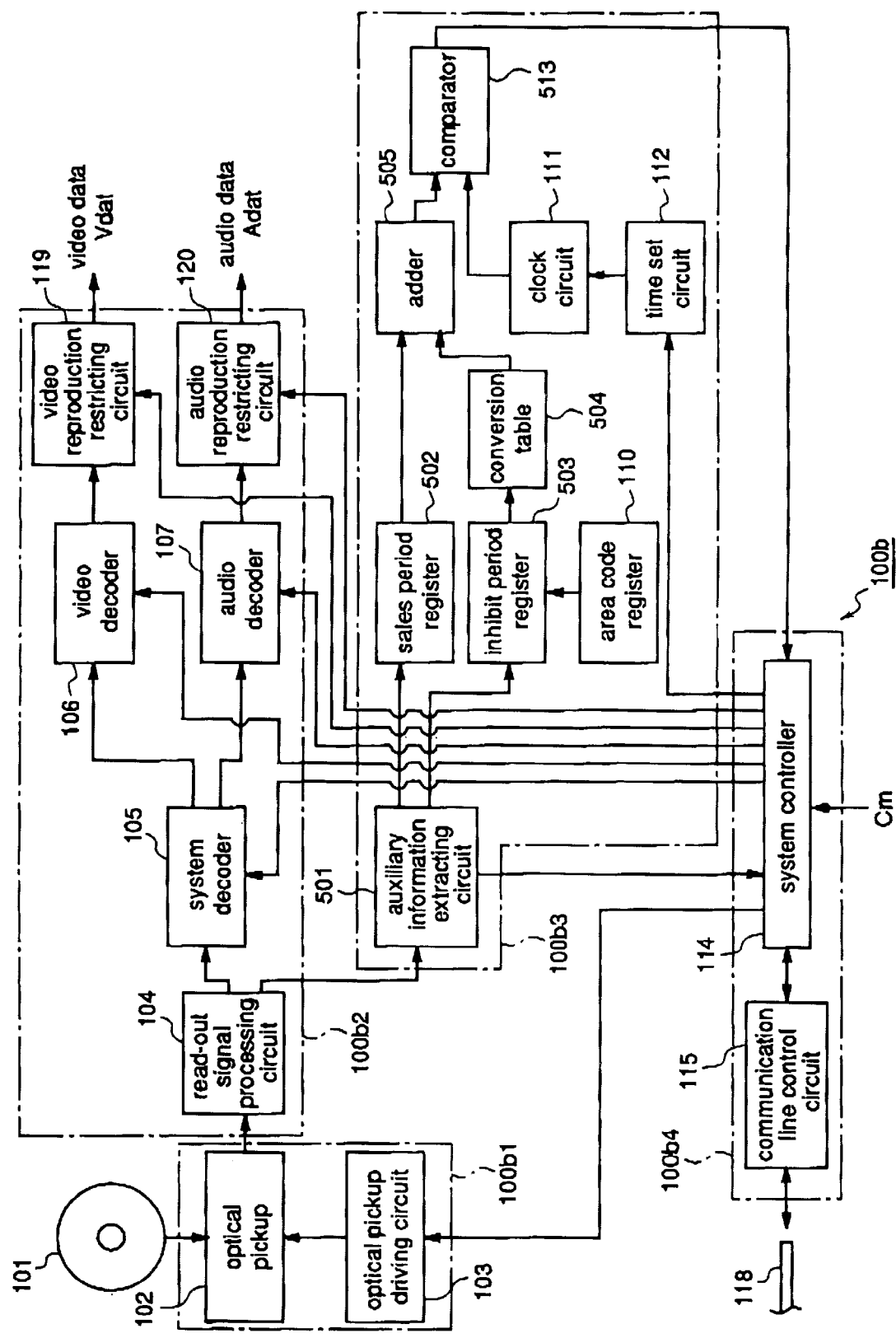
FIG. 5 is a block diagram illustrating an information decoding and reproducing apparatus according to a second embodiment of the present invention.

FIG. 5 is a block diagram illustrating an information decoding and reproducing apparatus according to a second embodiment of the present invention.

In the figure, reference numeral 100b designates an information decoding and reproducing apparatus for decoding and reproducing video information and audio information compressively recorded on an optical disk 101, like the information decoding and reproducing apparatus 100a according to the first embodiment.

The information decoding and reproducing apparatus 100b comprises an information read unit 100b1, a signal reproduction unit 100b2, an auxiliary information processing unit 100b3, and a control unit 100b4. The information read unit 100b1 and the signal reproduction unit 100b2 are identical to those of the information decoding and reproducing apparatus 100a according to the first embodiment.

In this second embodiment, the auxiliary information processing unit 100b3 includes an auxiliary information extracting circuit 501 in place of the auxiliary information extracting circuit 108 according to the first embodiment. The auxiliary information extracting circuit 501 selects sales year/month information and inhibit period information from auxiliary information supplied from the read-out signal processing circuit 104 and outputs the selected information separately from the other auxiliary information. The sales year/month information defines year/month in which sale of the software is started, and the inhibit period information defines a period of time from the sales year/month, during which viewing and listening of the software are inhibited. This inhibit period is set for each of different areas as sales targets of the software.

The auxiliary information processing unit 100b3 further comprises a sales year/month register 502 for storing the sales year/month information output from the auxiliary information extracting circuit 501, an area code register 110 in which an area code corresponding to a specific area among the above-mentioned target areas is set in advance, an inhibit period register 503 for selecting an inhibit period code of the area set in the area code register 110 from inhibit period codes corresponding to the respective target areas and storing the selected code, and a conversion table 504 for converting the inhibit period code from the register 503 to an actual inhibit period value.

Furthermore, the auxiliary information processing unit 100b3 comprises an adder 505 for adding an output from the sales year/month register 502 and an output from the conversion table 504, a clock circuit 111 for measuring an elapsed time from a reference time, a time set circuit 112 for setting the reference time of the clock circuit 111 on the basis of a control signal from the control unit 100b4, and a comparator 513 for receiving outputs from the clock circuit 111 and the adder 505 and comparing the present year/month with year/month obtained by adding the inhibit period to the sales year/month.

The control unit 100b4 comprises a system controller 114 for outputting control signals to the optical pickup driving circuit 103, the decoders 105~107, the reproduction restricting circuits 119 and 120, and the time set circuit 112 according to an output from the comparator 513, auxiliary information other than the sales year/month information and the inhibit period information, extracted by the auxiliary information extracting circuit 501, and a control signal Cm from the outside. The control unit 100b4 further comprises a communication line control circuit 115 for controlling communication between the system controller 114 and other information processing apparatus via a communication line 118.

FIG. 6(a) shows an example of assignment of sales year/month information and inhibit period information in auxiliary information recorded on an information recording media such as an optical disk together with main information. In this example, the sales year is represented by 12 bits, and the sales month is represented by 4 bits. As an inhibit period code, 4 bits are assigned to each area, so that 48 bits are assigned to inhibit period codes of eight areas. In the inhibit period register 503, among the inhibit period codes of the respective areas supplied from the auxiliary information extracting circuit 501, only the inhibit period code of the area specified by the area code register 110 is selected and stored. FIG. 6(b) shows an example of inhibit period codes. In this example, seven years can be described with a half year as the unit.

A description is given of the operation of the information decoding and reproducing apparatus.

The signal read unit 100b1 and the signal reproduction unit 100b2 operate in the same manner as those mentioned for the first embodiment.

When the auxiliary information output from the read-out signal processing circuit 104 is input to the auxiliary information extracting circuit 501, the auxiliary information extracting circuit 501 extracts, from the auxiliary information, sales year/month information giving year/month in which sale of the title is started, and inhibit period information giving, for each area, a period of time from the sales year/month, during which viewing and listening of the title is inhibited, separately from the other auxiliary information.

The sales year/month information is stored in the sales year/month register 502, and the inhibit period register 503 selects the inhibit period code of the area specified by the area code register 110 from the inhibit period codes corresponding to he respective target areas output from the auxiliary information extracting circuit 501 and stores the selected code. At this time, the other auxiliary information is sent to the system controller 114 and used for various controls as desired.

The inhibit period code is converted to a value of an actual period of time according to FIG. 6(b) by the conversion table 504 and supplied to the adder 505. In the adder 505, the value of the sales year/month register 502 is added to the value of the conversion table 504, and the result of the addition is output to the comparator 513. In the comparator 513, the year/month of the adder 505 is compared with the year/month of the clock circuit 111. When the year/month of the clock circuit 111 is larger than the year/month of the adder 505, 'Low' is output to the system controller 114. When the year/month of the clock circuit 111 is smaller than the year/month of the adder 505, 'High' is output to the system controller 114.

When the year/month of the adder 505 is equal to the year/month of the clock circuit 111, i.e., when sales year/month+inhibit period=present year/month, it is necessary to decide in advance which is output to the system controller 114, 'reproduction inhibit (High)' or 'reproduction permit (Low)'. Further, when the value of the inhibit period register 503 is '0000', the output from the comparator 513 is always 'Low' regardless of the inputs from the adder 505 and the clock circuit 111. When the value of the inhibit period register 503 is '111', the output from the comparator 513 is always 'High'.

In the system controller 114, when the output from the comparator 513 is 'High', the reproduction inhibiting process is carried out and, when the output from the comparator 513 is 'Low', the reproduction permitting process is carried out.

The reproduction inhibiting operation, the reproduction permitting operation, and the time setting operation of the clock circuit 111 are identical to those mentioned for the first embodiment.

As described above, according to the second embodiment of the present invention, the information decoding and reproducing apparatus is provided with the auxiliary information extracting circuit 501 for extracting, from information read from the optical disk, the sales year/month information and the inhibit period codes set for the respective target areas, together with the other auxiliary information; the area code register 110 in which the area code corresponding to a target sales area of the information decoding and reproduction apparatus is set at the shipping of the apparatus from the factory; the inhibit period register 503 for selecting an inhibit period code corresponding to the area code set in the area code register 110 from the extracted inhibit period codes corresponding to the respective areas and storing the selected code; and the conversion table 504 for converting the inhibit period code to a value of an actual period. In this apparatus, according to whether or not the present year/month is before the passage of the inhibit period from the sales year/month, reproduction of the video and audio data included in the information read from the optical disk is inhibited or permitted. Therefore, reproduction of the video and audio data recorded on media, such as optical disks, can be restricted for each area with the sales year/month of the software as a reference. Accordingly, the use of a software, such as movie, can be permitted after a prescribed period set for each area has passed from the sales time in each area.

[Embodiment 3]

Figure 7:
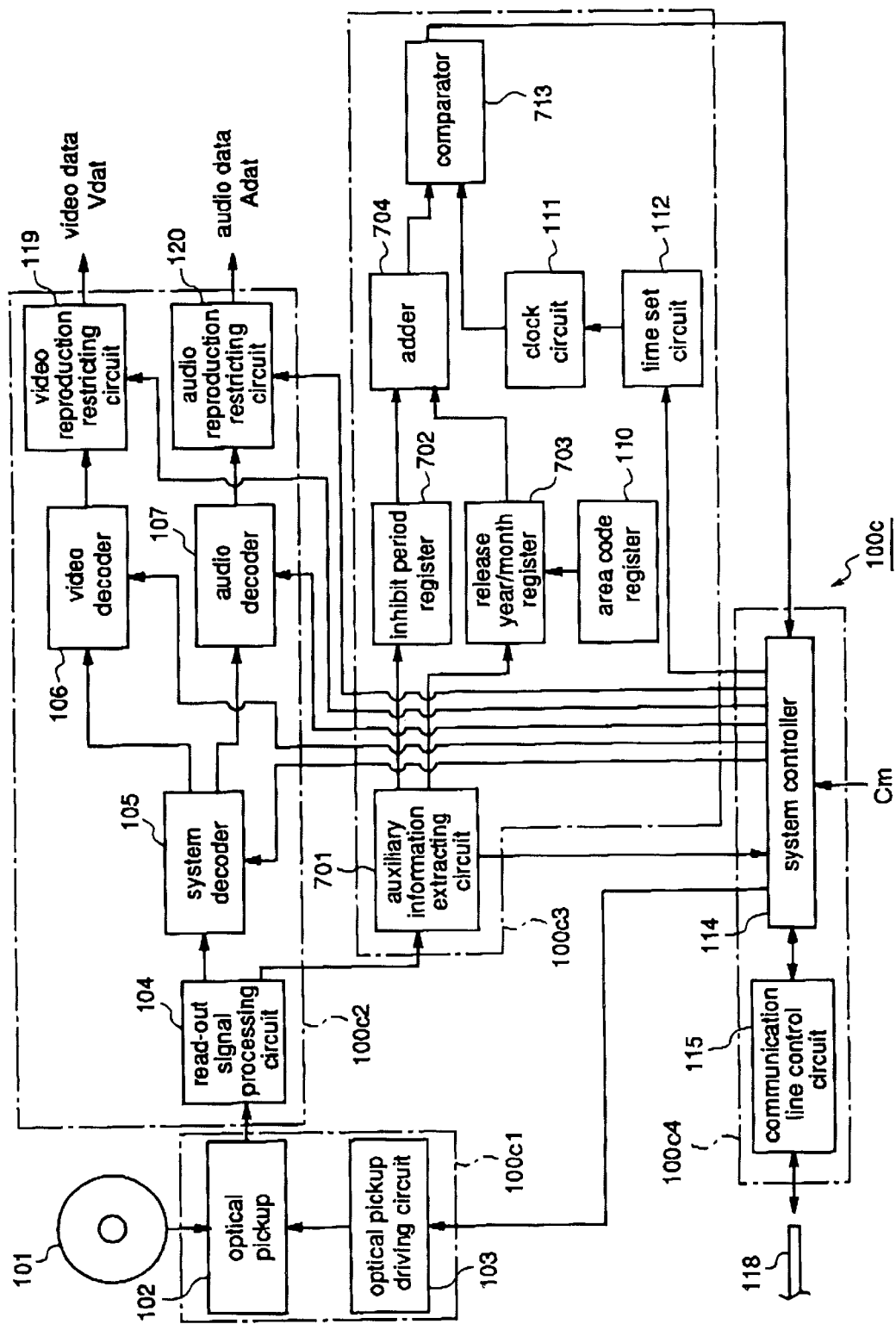
FIG. 7 is a block diagram illustrating an information decoding and reproducing apparatus according to a third embodiment of the present invention.

FIG. 7 is a block diagram illustrating an information decoding and reproducing apparatus according to a third embodiment of the present invention.

In FIG. 7, reference number 100c designates an information decoding and reproducing apparatus for decoding and reproducing video information and audio information compressively recorded on an optical disk 101, like the information decoding and reproducing apparatus 100a according to the first embodiment.

The information decoding and reproducing apparatus 100c comprises an information read unit 100c1, a signal reproduction unit 100c2, an auxiliary information processing unit 100c3, and a control unit 100c4. The information read unit 100c1 and the signal reproduction unit 100c2 are identical to those of the information decoding and reproducing apparatus 100a according to the first embodiment.

In this third embodiment, the auxiliary information processing unit 100c3 includes an auxiliary information extracting circuit 701 in place of the auxiliary information extracting circuit 108 according to the first embodiment. The auxiliary information extracting circuit 701 selects inhibit period information and release year/month information from auxiliary information supplied from the read-out signal processing circuit 104 in the signal reproduction unit 100c2 and outputs the selected information separately from the other auxiliary information. More specifically, the inhibit period information defines a period of time, from release of a software (title), during which reproduction of the software (title) is inhibited. The release year/month information defines year/month in which the software (title) is released, corresponding to each of target areas for the sale of the software.

The auxiliary information processing unit 100c3 further comprises an inhibit period register 702 for storing inhibit year/month information output from the auxiliary information extracting circuit 701, an area code register 110 in which an area code corresponding to a specific area in the above-mentioned target areas is set in advance, a release year/month register 703 for selecting release year/month information of the area set in the area code register 110, and an adder 704 for adding a value of the inhibit period register 702 and a value for the release year/month register 703.

Furthermore, the auxiliary information processing unit 100c3 comprises a clock circuit 111 for measuring an elapsed time from a reference time, a time set circuit 112 for setting the reference time of the clock circuit 111 on the basis of a control signal from the control unit 100c4, and a comparator 713 for receiving outputs from the clock circuit 111 and the adder 704 and comparing the present year/month with year/month obtained by adding the inhibit period to the release year/month.

The control unit 100c4 comprises a system controller 114 for outputting control signals to the optical pickup driving circuit 103, the decoders 105~107, the reproduction restricting circuits 119 and 120, and the time set circuit 112 according to an output from the comparator 713, auxiliary information other than the inhibit period information and the release year/month information extracted by the auxiliary information extracting circuit 701, and a control signal Cm from the outside. The control unit 100c4 further comprises a communication line control circuit 115 for controlling communication between the system controller 114 and other information processing apparatus via a communication line 118.

Figure 8:
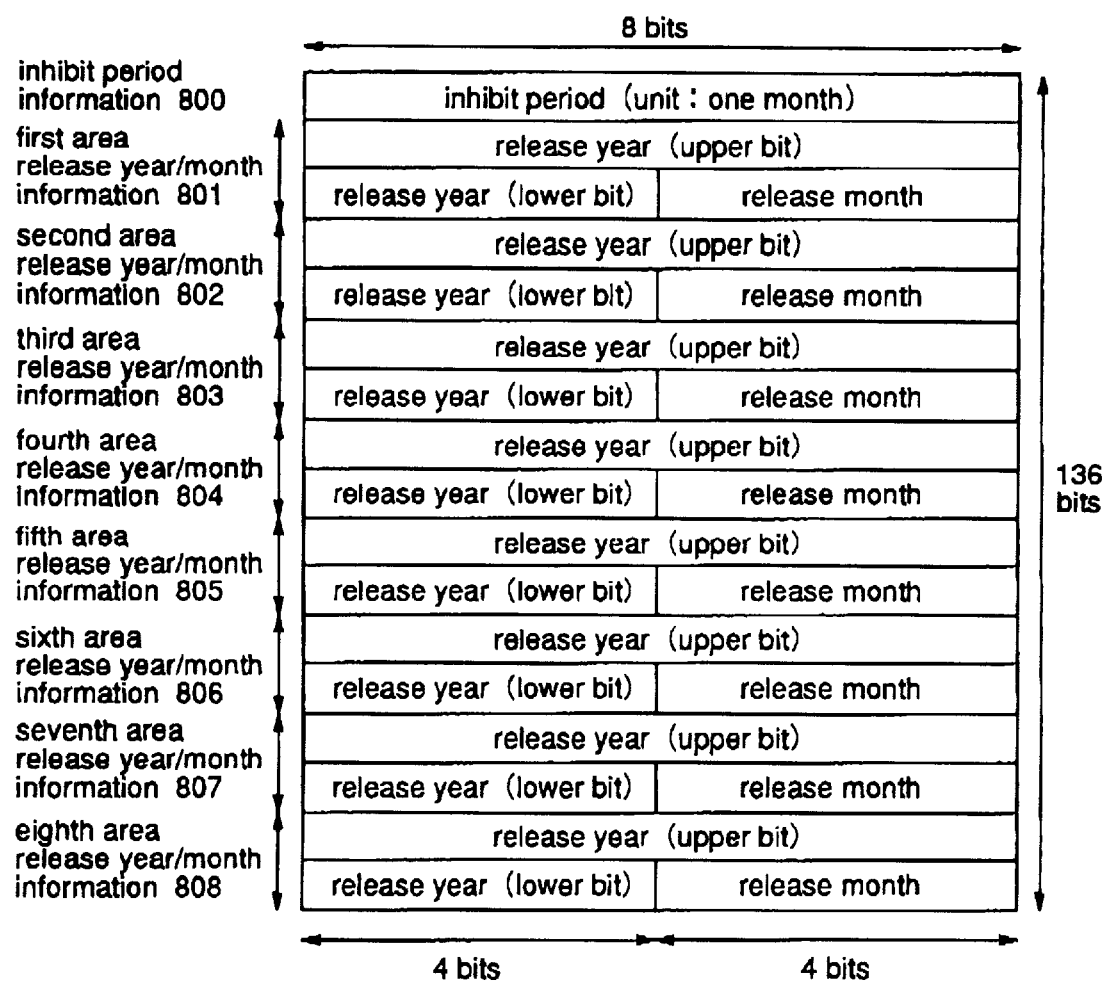
FIG. 8 is a digram illustrating a format of auxiliary information recorded on an optical disk used in the apparatus according to the third embodiment.

FIG. 8 shows an example of assignment of eight pieces of release year/month information 801 to 808 corresponding to the respective areas and inhibit period information 800, in auxiliary information recorded on an information recording media such as an optical disk together with main information. In this example, the release year for each area is represented by 12 bits, the release month for each area is represented by 4 bits, and an inhibit period common to all the areas is represented by 8 bits, In total, 136 bits are assigned to these information. Here, since the inhibit period information 800 is represented in months, according to the above-mentioned assignment of bits, a range from 0 to 255 months can be represented.

A description is given of the operation of the information decoding and reproducing apparatus.

The signal read unit 100c1 and the signal reproduction unit 100c2 operate in the same manner as those mentioned for the first embodiment.

When the auxiliary information output from the read-out signal processing circuit 104 is input to the auxiliary information extracting circuit 701, the auxiliary information extracting circuit 701 extracts, from the auxiliary information, inhibit period information giving a period of time from release of the title, during which reproduction of the title is inhibited, and release year/month information giving year/month in which the title is released in each area, separately from the other auxiliary information.

The inhibit period information is stored in the inhibit period register 702, and the release year/month register 703 selects the release year/month information of the area specified by the area code register 110 from plural pieces of release year/month information corresponding to the respective target areas outputs from the auxiliary information extracting circuit 701 and stores the selected information. At this time, the other auxiliary information is sent to the system controller 114 and used for various controls as desired.

The value of the release year/month register 703 is added to the value of the inhibit period register 702 in the adder 704, and the result of the addition is supplied to the comparator 713. In the comparator 713, the output from the adder 704 is compared with the output from the clock circuit 111. When the year/month shown by the output of the clock circuit 111 is larger than the year/month shown by the output of the adder 704, 'Low' is output to the system controller 114. When the year/month shown by the output of the clock circuit 111 is smaller than the year/month shown by the output of the adder 704, 'High' is output to the system controller 114.

When the year/month shown by the output of the adder 704 is equal to the year/month shown by the output of the clock circuit 111, i.e., when release year/month+inhibit period=present year/month, it is necessary to decide in advance which is output to the system controller 114, 'reproduction inhibit (High)' or 'reproduction permit (Low)'.

In the system controller 114, when the signal from the comparator 713 is 'High', the reproduction inhibiting process is carried out and, when the signal from the comparator 713 is 'Low', the reproduction permitting process is carried out.

The reproduction inhibiting operation, the reproduction permitting operation, and the time setting operation of the clock circuit 111 are identical to those mentioned for the first and second embodiments and, therefore, do not require repeated description.

As described above, according to the third embodiment of the present invention, the information decoding and reproducing apparatus is provided with the auxiliary information extracting circuit 701 for extracting, from information read from the optical disk, the inhibit period information and the release year/month information set for the respective target areas, together with the other auxiliary information; the area code register 110 in which the area code corresponding to a target sales area of the information decoding and reproduction apparatus is set at the shipping of the apparatus from the factory; and the release year/month register 703 for selecting release year/month information corresponding to the area code set in the area code register 110 form the extracted year/month information corresponding to the respective areas and storing the selected code. In this apparatus, according to whether or not the present year/month is before the passage of the inhibit period from the release year/month, reproduction of the video and audio data included in the information read from the optical disk is inhibited or permitted. Therefore, reproduction of the video and audio data recorded on media such as optical disks can be restricted for each area with reference to the release year/month of the software (title), set for each area. Accordingly, the use of a software, such as a movie, can be permitted after a prescribed period has passed from the release time of the title in each area.

[Embodiment 4]

Figure 9:
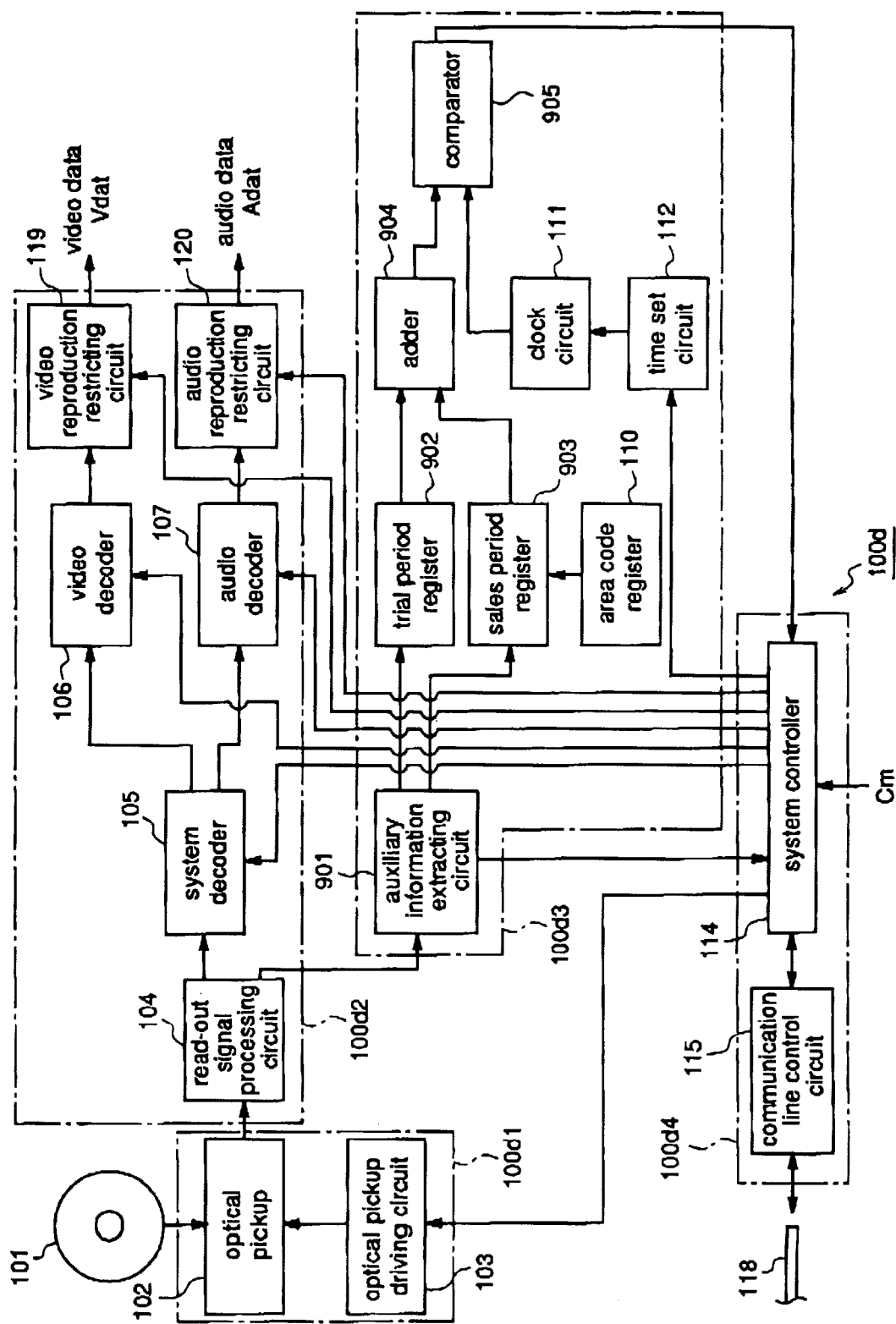
FIG. 9 is a block diagram illustrating an information decoding and reproducing apparatus according to a fourth embodiment of the invention.

FIG. 9 is a block diagram illustrating an information decoding and reproducing apparatus according to a fourth embodiment of the present invention.

In the figure, reference numeral 100*d* designates an information decoding and reproducing apparatus for decoding and reproducing video information and audio information compressively recorded on an optical disk 101, like the information decoding and reproducing apparatus 100*a* according to the first embodiment.

The information decoding and reproducing apparatus 100*d* comprises an information read unit 100*d*1, a signal reproduction unit 100*d*2, an auxiliary information processing unit 100*d*3, and a control unit 100*d*4. The information read unit 100*d*1 and the signal reproduction unit 100*d*2 are identical to those of the information decoding and reproducing apparatus 100*a* according to the first embodiment.

In this fourth embodiment, the auxiliary information processing unit 100*d*3 includes an auxiliary information extracting circuit 901 in place of the auxiliary information extracting circuit 108 according to the first embodiment. The auxiliary information extracting circuit 901 selects trial period information and inhibit period information from auxiliary information supplied from the read-out signal processing circuit 104 and outputs the selected information separately from the other auxiliary information. More specifically, the trial period information defines a period from sale of a software (title), during which reproduction of the software is permitted on trial, and the sales year/month information defines year/month in which sale of the software (title) is started in each of target areas for the sales of the software.

The auxiliary information processing unit 100*d*3 further comprises a trial period register 902 for storing the trial period information output from the auxiliary information extracting circuit 901, an area code register 110 in which an area code corresponding to a specific area among the above-mentioned target areas is set in advance, and a sales year/month register 903 for selecting sales year/month information of the area set in the area code register 110 from plural pieces of sales year/month information corresponding to the respective target areas and storing the selected information.

Furthermore, the auxiliary information processing unit 100*d*3 comprises an adder 904 for adding an output from the trial period register 902 and an output from the sales year/month register 903, a clock circuit 111 for measuring an elapsed time from a reference time, a time set circuit 112 for setting the reference time of the clock circuit 111 on the basis of a control signal from the control unit 100*d*4, and a comparator 905 for receiving outputs from the clock circuit 111 and the adder 904 and comparing the present year/month with year/month obtained by adding the trial period to the sales year/month.

The control unit 100*d*4 comprises a system controller 114 for outputting control signals to the optical pickup driving circuit 103, the decoders 105~107, the reproduction restricting circuits 119 and 120, and the time set circuit 112 according to an output from the comparator 905, auxiliary information other than the trial period information and the sales year/month information, extracted by the auxiliary information extracting circuit 901, and a control signal Cm from the outside. The control unit 100*d*4 further comprises a communication line control circuit 115 for controlling communication between the system controller 114 and other information processing apparatus via a communication line 118.

Figure 10:
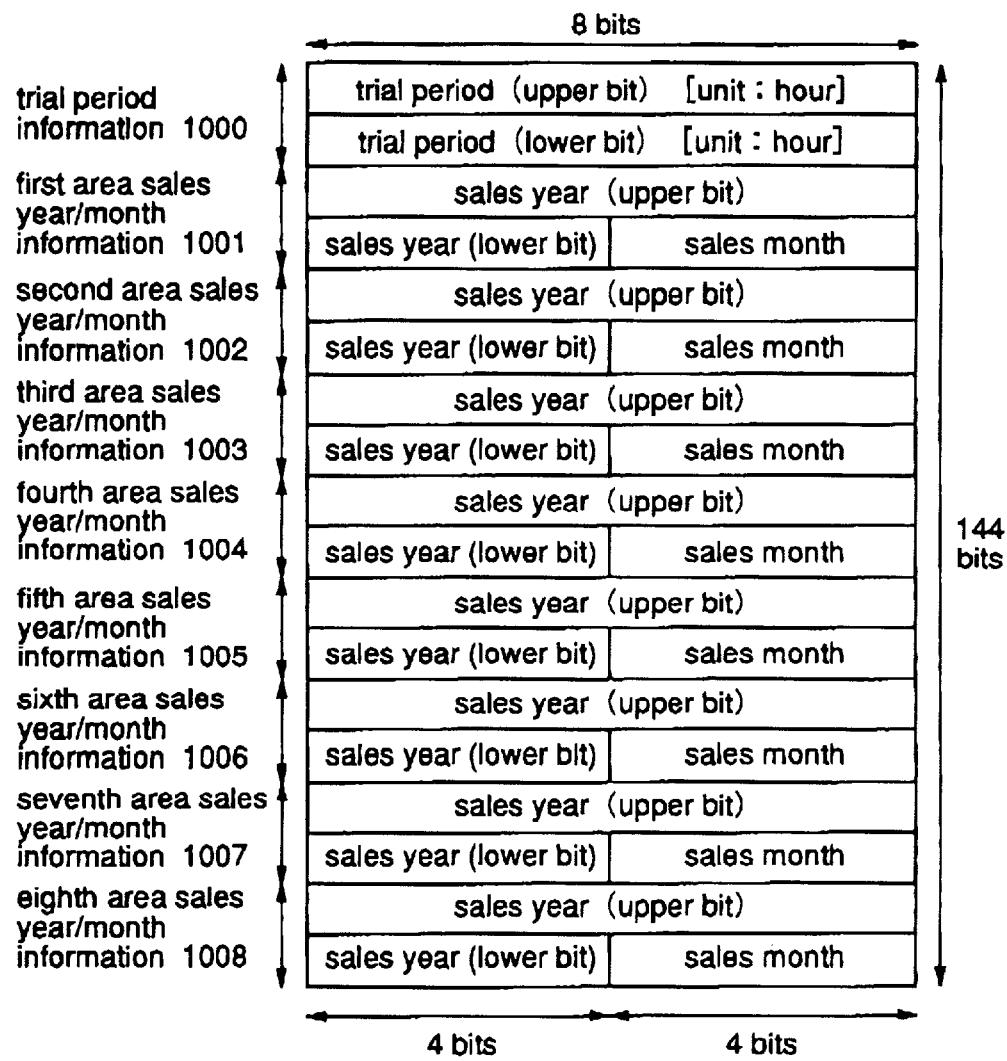
FIG. 10 is a diagram illustrating a format of auxiliary information recorded on an optical disk used in the apparatus according to the fourth embodiment.

FIG. 10 shows an example of assignment of eight pieces of sales year/month information 1001 to 1008 corresponding to the respective target areas and trial period information 1000, in auxiliary information recorded on an information recording media such as an optical disk together with main information. In this example, the sales year for each area is represented by 12 bits, the sales month is represented by 4 bits, and a trial period common to all the areas is represented by 16 bits. In total, 144 bits are assigned to these information. Since the trial period information 1000 is represented in hours, setting of the period is possible in a range from 0 to 65535 hours (= about 2730 days).

A description is given of the operation of the information decoding and reproducing apparatus.

The signal read unit 100*d*1 and the signal reproduction unit 100*d*2 operate in the same manner as those mentioned for the first embodiment.

When the auxiliary information output from the read-out signal processing circuit 104 is input to the auxiliary information extracting circuit 901, the auxiliary information extracting circuit 901 extracts, from the auxiliary information, trial period information giving a period from the sale of the title, during which reproduction of the title is permitted on trial, and sales year/month information giving the year/month in which the sale of the title is started in each target area, separately from the other auxiliary information.

The trial period information shown in FIG. 10 is stored in the trial period register 902, and the inhibit period register 903 selects the sales year/month information of the area specified by the area code register 110 from plural pieces of sales year/month information corresponding to the respective target areas output from the auxiliary information extracting circuit 701 and stores the selected information. At this time, the other auxiliary information is sent to the system controller 114 and used for various controls as desired.

The value of the sales year/month register 903 is added to the value of the trial period register 902 in the adder 904, and the result of the addition is output to the comparator 905. In the comparator 905, the year, month, and time (hereinafter, referred to as year/month/time) shown by the output of the adder 904 is compared with the year/month/time shown by the output of the clock circuit 111. When the year/month/time output from the clock circuit 111 is larger than the year/month/time output from the adder 904, 'High' is output from the comparator 905 to the system controller 114. When the year/month/time output from the clock circuit 111 is smaller than the year/month/time output from the adder 904, 'Low' is output from the comparator 905 to the system controller 114.

When the year/month/time output from the adder 904 is equal to the year/month/time output from the clock circuit 111, i.e., when sales year/month+trial period=present year/month/time, it is necessary to decide in advance which is output to the system controller 114, 'reproduction inhibit (High)' or 'reproduction permit (Low)'.

In the system controller 114, when the signal from the comparator 905 is 'High', the reproduction inhibiting process is carried out and, when the signal from the comparator 905 is 'Low', the reproduction permitting process is carried out.

The reproduction inhibiting operation, the reproduction permitting operation, and the time setting operation of the clock circuit 111 are identical to those mentioned for the first to third embodiments and, therefore, do not require repeated description.

As described above, according to the fourth embodiment of the present invention, the information decoding and reproducing apparatus is provided with the auxiliary information extracting circuit 901 for extracting, from information read from the optical disk, the trial period information and the sales year/month information set for the respective target areas, together with the other auxiliary information; the area code register 110 in which an area code corresponding to a target sales area of the information decoding and reproduction apparatus is set at the shipping of the apparatus from the factory; and the sales year/month register 903 for selecting sales year/month information corresponding to the area code set in the area code register 110 from the extracted sales year/month information corresponding to the respective areas, and storing the selected information. In this apparatus, according to whether or not the present year/month is before the passage of the trial period from the sales year/month, reproduction of the video and audio data included in the information read from the optical disk is inhibited or permitted. Therefore, reproduction of the video and audio data recorded on media such as optical disks can be restricted, for each area, with reference to the sales year/month of the software (title), set for each area. Accordingly, the trial use of a software, such as a movie, can be permitted for a prescribed period from the sales time of the title in each area.

In this fourth embodiment, reproduction of a software is permitted for a prescribed trial period from the sales year/month of the software in each area and, when the period has passed, the reproduction is inhibited. However, this fourth embodiment can be combined with the third embodiment and, in the case, the reproduction is again permitted when a prescribed period has passed after this end of the trial period.

[Embodiment 5]

Figure 11:
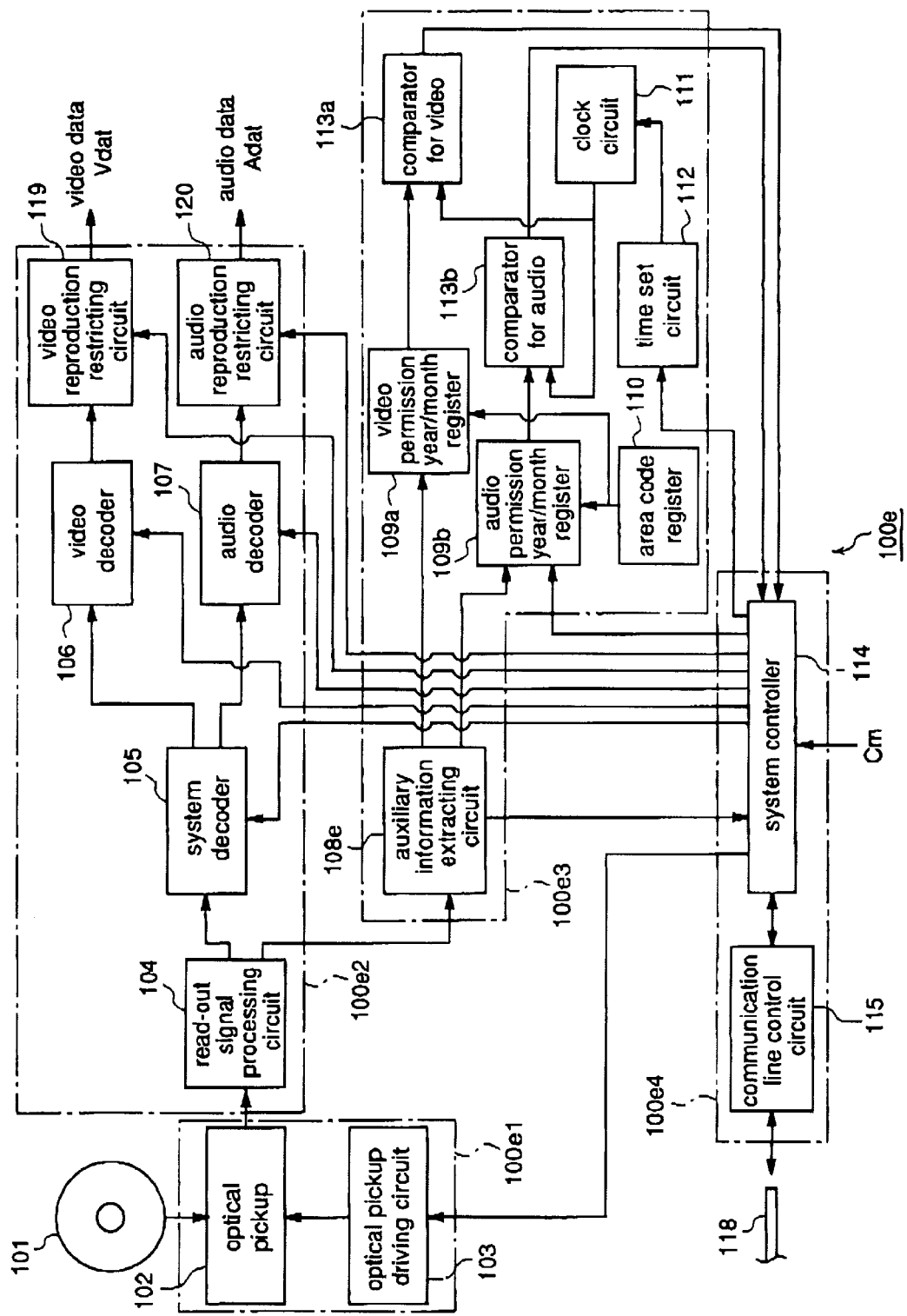
FIG. 11 is a block diagram illustrating an information decoding apparatus according to a fifth embodiment of the invention.

FIG. 11 is a block diagram illustrating an information decoding and reproducing apparatus according to a fifth embodiment of the invention.

In the figure, reference numeral 100e designates an information decoding and reproducing apparatus for decoding and reproducing video information and audio information compressively recorded on an optical disk 101, like the information decoding and reproducing apparatus 100a according to the first embodiment. In this fifth embodiment, however, with respect to audio information, eight pieces of audio information corresponding to eight channels are recorded on the optical disk 101 as main information.

The information decoding and reproducing apparatus 100e comprises an information read unit 100e1, a signal reproduction unit 100e2, an auxiliary information processing unit 100e3, and a control unit 100e4. The information read unit 100e1 is identical to that of the information decoding and reproducing apparatus 100a according to the first embodiment. Further, the signal reproduction unit 100e2 is different from the signal reproduction unit 100a2 according to the first embodiment in that the audio decoder 107 can select one of eight pieces of audio information corresponding to eight channels, according to a control signal from the control unit 100e4.

Figure 12:
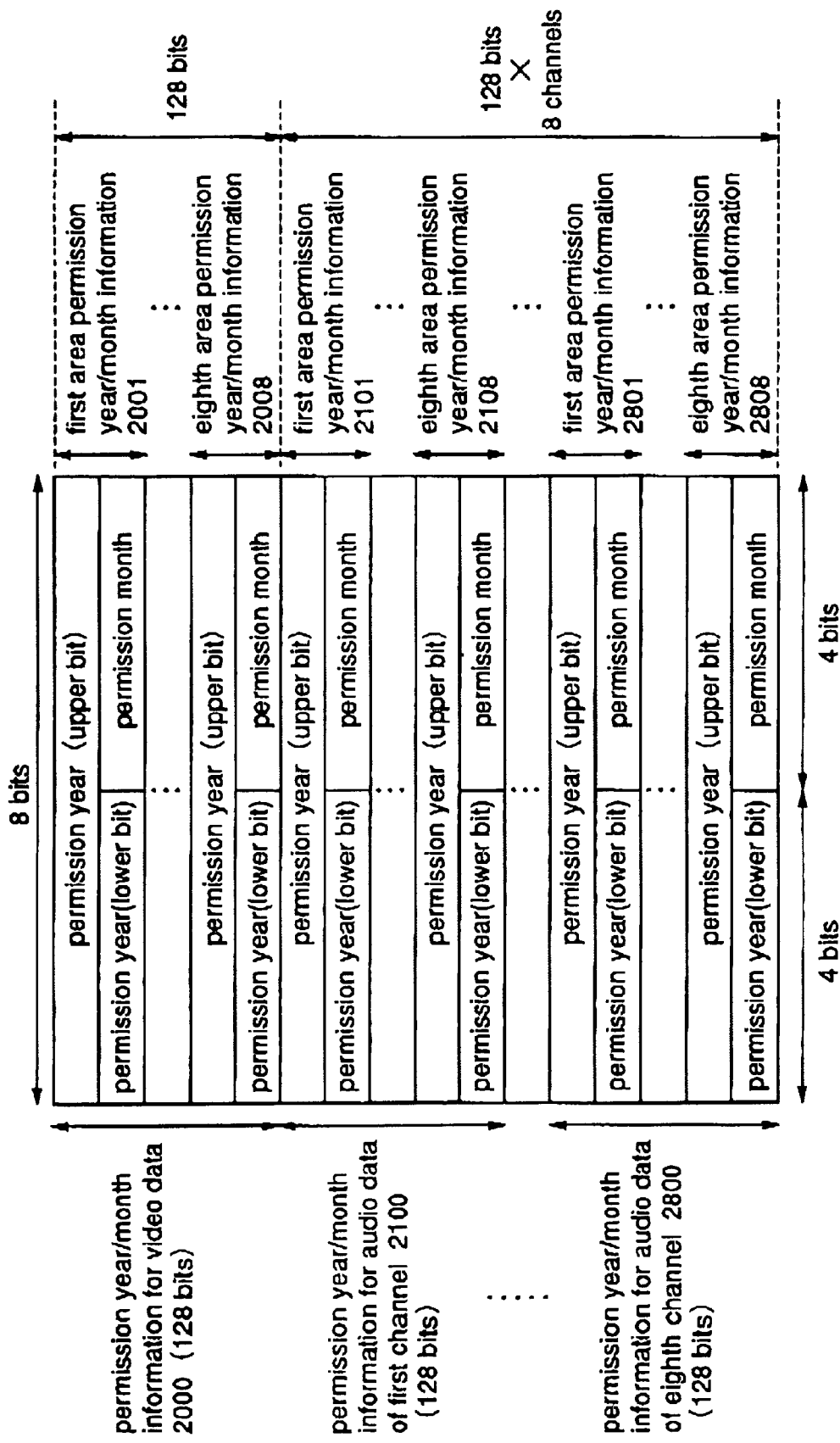
FIG. 12 is a diagram illustrating a format of auxiliary information recorded on an optical disk used in the apparatus according to the fifth embodiment.

The auxiliary information processing unit 100e3 includes an auxiliary information extracting circuit 108e in place of the auxiliary information extracting circuit 108 according to the first embodiment. The auxiliary information extracting circuit 108e extracts permission year/month information from auxiliary information supplied from the read-out signal processing circuit 104 in the signal reproduction unit 102e2 and outputs the information separately from the other auxiliary information. As shown in FIG. 12, the permission year/month information is composite permission year/month information comprising year/month date 2000 for permitting reproduction of video data (hereinafter, referred to as video permission year/month information), and eight pieces of year/month information 2100 to 2800 for permitting reproduction of audio data (hereinafter, referred to as audio permission year/month information) corresponding to the first to eight channels, respectively.

To be specific, the video permission year/month information 2000 comprises eight pieces of permission year/month information 2001 to 2008 corresponding to the first to eighth areas (hereinafter, referred to as local permission year/month information), and 16 bits are assigned to each of the local permission year/month information, so that the video permission year/month information 2000 is represented by 128 bits in total. That is, in each area, the reproduction permitting year is represented by 12 bits while the reproduction permitting month is represented by 4 bits.

In addition, each of the eight pieces of audio permission year/month information 2100~2800 respectively corresponding to the first to eighth channels comprises eight pieces of local permission year/month information corresponding to the eight areas, i.e., 2101~2108, . . . , 2801~2808. Since 16 bits are assigned to each of the local permission year/month information, the audio permission year/month information of all the channels is represented by 128 bits×8 channels. Accordingly, with respect to a single piece of local permission year/month information constituting the audio permission year/month information corresponding to one channel, the reproduction permitting year is represented by 12 bits, and the reproduction permitting month is represented by 4 bits.

The auxiliary information extracting circuit 108e in the auxiliary information processing unit 100e3 extracts the video permission year/month information and the audio permission year/month information corresponding to the respective channels from the auxiliary information supplied from the read-out signal processing circuit 104, separately from the other auxiliary information.

The auxiliary information processing unit 100e3 further comprises an area code register 110 in which an area code corresponding to a specific area among the above-mentioned target areas is set in advance; a video permission year/month register 109a for selecting local video permission year/month information corresponding to the area set in the area code register 110 from the eight pieces of local video permission year/month information corresponding to the eight areas, and storing the selected information, and an audio permission year/month register 109b for selecting local audio permission year/month information corresponding to the area code set in the area code register 110 from the eight pieces of local audio permission year/month information corresponding to the eight areas and constituting the audio permission year/month information corresponding to one channel selected by an external control signal Cm, and storing the selected information.

Furthermore, the auxiliary information processing unit 100e3 comprises a clock circuit 111 for measuring an elapsed time from a reference time, a time set circuit 112 for setting the reference time of the clock circuit 111 on the basis of a control signal from the control unit 100e4, a video comparator 113a for receiving outputs from the clock circuit 111 and the video permission year/month register 109a and comparing the present time with the permission year/month, and an comparator for audio 113b for receiving outputs from the clock circuit 111 and the audio permission year/month register 109b and comparing the present time with the permission year/month.

The control unit 100e4 comprises a system controller 114 for outputting control signals to the optical pickup driving circuit 103, the decoders 105~107, the reproduction restricting circuits 119 and 120, the audio permission year/month register 109b, and the time set circuit 112 according to outputs from the comparators 113*a* and 113*b*, auxiliary information other than the video permission year/month information and the audio permission year/month information corresponding to the respective channels, extracted by the auxiliary information extracting circuit 108*e*, and the control signal Cm from the outside. The control unit 100*e*4 further comprises a communication line control circuit 115 for controlling communication between the system controller 114 and other information processing apparatus via a communication line 118.

A description is given of the operation of the information decoding and reproducing apparatus 100*e*.

The signal read unit 100*e*1 operates in the same manner as that described for the first embodiment. The signal reproduction unit 100*e*2 is different from that according to the first embodiment in that channel switching is possible in the audio decoder 107.

When the auxiliary information output from the read-out signal processing circuit 104 is input to the auxiliary information extracting circuit 108*e*, the auxiliary information extracting circuit 108*e* extracts the video permission year/month information and the eight pieces of audio permission year/month information corresponding to the eight, from the auxiliary information.

Then, the video permission year/month register 109*a* selects permission year/month information of the area specified by the area code register 110 from the input video permission year/month information corresponding to the respective target areas and stores the selected information. On the other hand, the audio permission year/month register 109*b* selects audio permission year/month information corresponding to the channel set by the external control signal from the eight pieces of audio permission year/month information corresponding to the eight channels and, furthermore, the register 109*b* selects, from the selected audio permission year/month information of the set channel, permission year/month information of the area specified by the area code register 110, and stores the selected information. At this time, the other auxiliary information is sent to the system controller 114 and used for various controls as desired.

In the video comparator 113*a*, the output from the video permission year/month register 109*a* is compared with the output from the clock circuit 111. In the comparator for audio 113*b*, the output from the audio permission year/month register 109*b* is compared with the output from the clock circuit 111. In each of the comparators 113*a* and 113*b*, when the output from the clock circuit 111 (year/month/time) is larger than the output from the register, 'High' is output. When the output from the clock circuit 111 is smaller than the output from the register, 'Low' is output.

In the system controller 114, according to outputs from the comparators 113*a* and 113*b*, the video reproduction restricting circuit 119 and the audio reproduction restricting circuit 120 are controlled to restrict reproduction of the video data and the audio data. More specifically, when the signal from the video comparator 113*a* is 'High', reproduction of the video data is inhibited. Conversely, when the signal from the comparator 113*a* is 'Low', reproduction of the video data is permitted. Likewise, when the signal from the comparator for audio 113*b* is 'High', reproduction of the audio data is inhibited. Conversely, when the signal from the comparator 113*b* is 'Low', reproduction of the audio data is permitted. Also in this fifth embodiment, the video data reproduction inhibiting operation, the video data reproduction permitting operation, and the time setting operation of the clock circuit 111 are identical to those mentioned for the first to third embodiments and, therefore, do not require repeated description. Furthermore, performed as the audio data reproduction inhibiting operation is to superimpose noise on the output of the audio decoder.

As described above, according to the fifth embodiment of the present invention, the information decoding and reproducing apparatus is provided with the auxiliary information extracting circuit 108*e* for extracting, from information read from the optical disk, eight pieces of video permission year/month information corresponding to eight target areas and eight pieces of audio permission year/month information corresponding to eight channels, each comprising eight pieces of audio permission year/month information corresponding to the eight areas; the video permission year/month register 109*a* for selecting video permission year/month information corresponding to a specified area code from the extracted eight pieces of video permission year/month information of the eight areas and storing the selected information; and the audio permission year/month register 109*b* for selecting audio permission year/month information corresponding to the specified area code and to a channel selected by the user from the eight pieces of audio permission year/month information of the eight channels. In this apparatus, since the present year/month is compared with the year/month defined by the selected video permission year/month information and with the year/month defined by the selected audio permission information, reproduction of the video data and the audio data read from the optical disk can be restricted for each area, independently between the video data and the audio data. Further, it is possible to perform area to area restriction of reproduction of audio data in a channel selected by the user form the eight pieces of audio data corresponding to the eight channels. Accordingly, the use of a software, such as a movie, can be restricted in various ways, adaptively to the sales time of the software in each area.

In the recording format of auxiliary information according to this fifth embodiment shown in FIG. 12, the eight pieces of video permission year/month information corresponding to the first to eighth areas are recorded as a block, and the eight pieces of audio permission year/month information corresponding to the first to eighth areas are recorded as a block for each channel. However, the recording format of permission year/month information is not restricted thereto.

Figure 13:
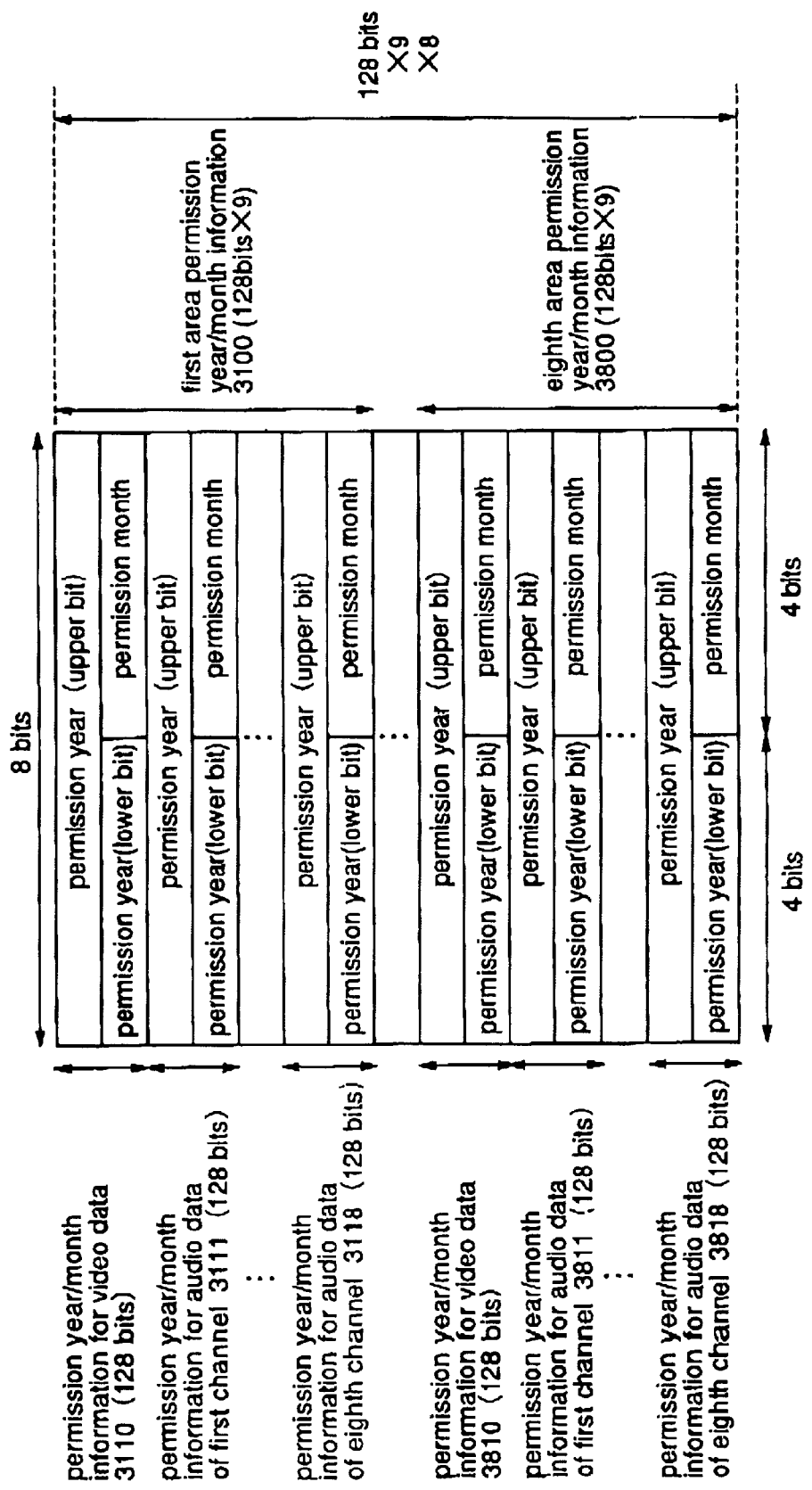
FIG. 13 is a diagram illustrating another format of auxiliary information recorded on the optical disk according to the fifth embodiment.

For example, as shown in FIG. 13, video and audio permission year/month information may be recorded as a block for each of the first to eighth areas, i.e., eight blocks of composite permission year/month information 3100~3800 respectively corresponding to the first to eighth areas are recorded. To be specific, the video permission year/month information corresponding to each area (3110, . . . , 3810) and the eight pieces of audio permission year/month information corresponding to the first to eighth channels of the corresponding area (3111~3118. . . , 3811~3818) are recorded together as a block.

[Embodiment 6]

Figure 14:
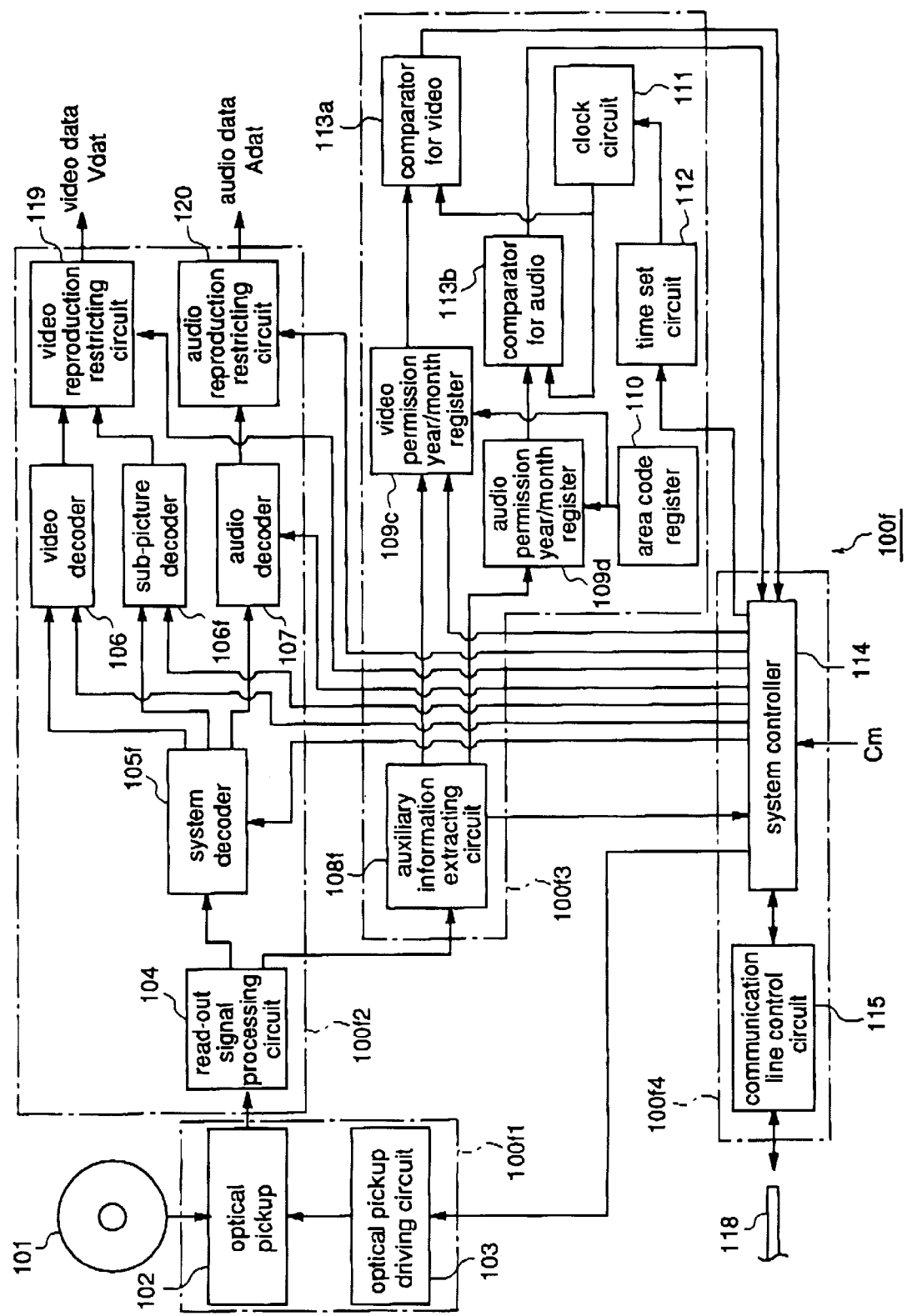
FIG. 14 is a block diagram illustrating an information decoding and reproducing apparatus according to a sixth embodiment of the invention.

FIG. 14 is a block diagram illustrating an information decoding and reproducing apparatus according to a sixth embodiment of the invention.

In the figure, reference numeral 100*f* designates an information decoding and reproducing apparatus for decoding and reproducing video information and audio information compressively recorded on an optical disk 101, like the information decoding and reproducing apparatus 100*a* according to the first embodiment. In this sixth embodiment, however, video data of 9 channels and sub-picture data of 32 channels are recorded on the optical disk together with the audio data.

The information decoding and reproducing apparatus 100f comprises an information read unit 100f1, a signal reproduction unit 100f2, an auxiliary information processing unit 100f3, and a control unit 100f4. The information read unit 100f1 is identical to that of the information decoding and reproducing apparatus 100a according to the first embodiment.

The signal reproduction unit 100f2 includes a system decoder 105f in place of the system decoder according to the first embodiment. The system decoder 105f separates a video stream, an audio stream, and a sub-picture stream from a program stream output from the read-out signal processing circuit 104 according to a control signal from the control unit 100f4. In addition to the video decoder 106 and the audio decoder 107, the signal reproduction unit 100f2 includes a sub-picture decoder 106f for decoding the sub-picture stream according to a control signal from the control unit 100f4. The video decoder 106 can select one of the 9-channel video data according to a control signal from the control unit 100f4, and the sub-picture decoder 106f can select one of the 32-channel sub-picture data according to a control signal from the control unit 100f4. Other constituents are identical to those of the signal reproduction unit 100a2 according to the first embodiment.

Figure 15:
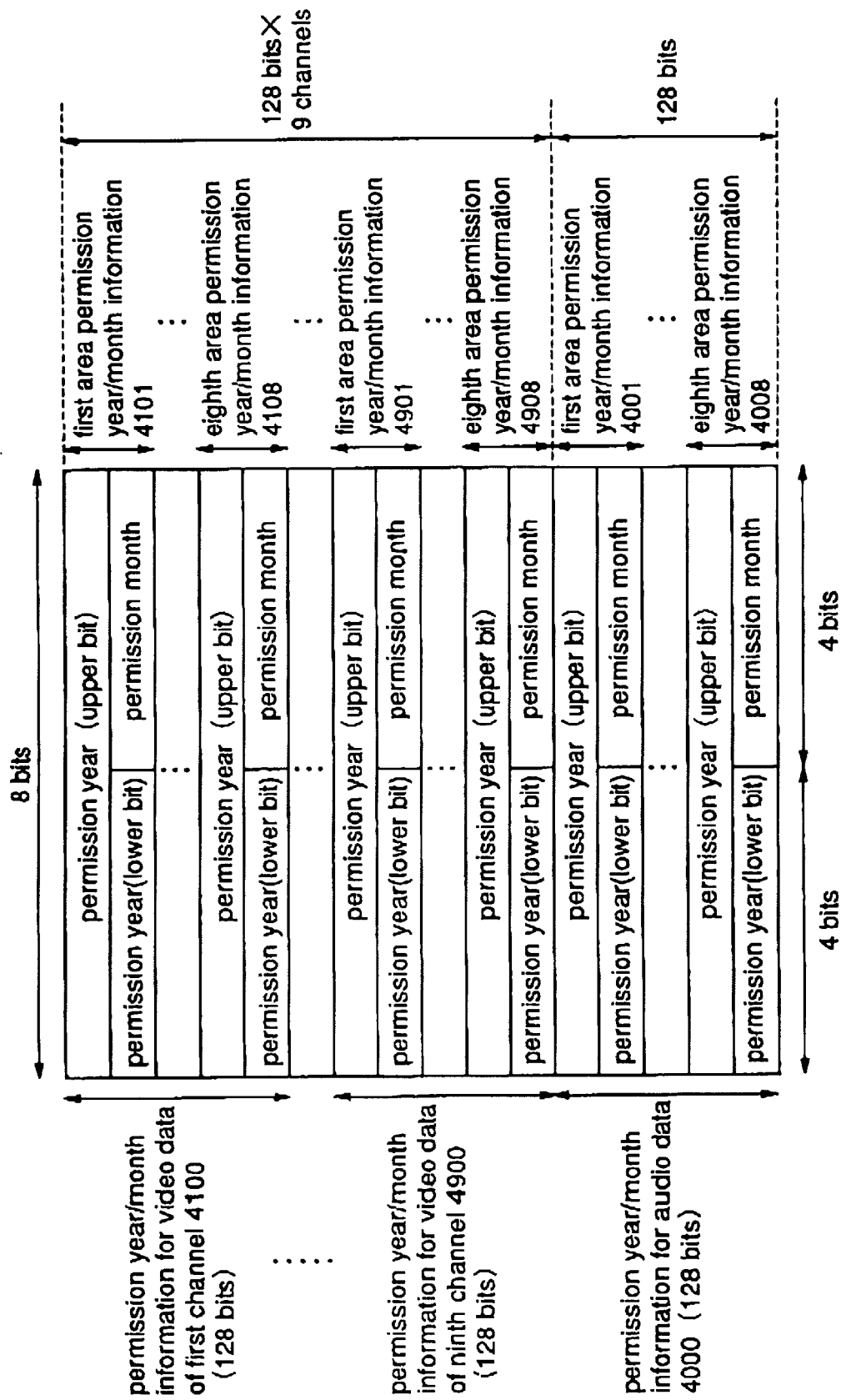
FIG. 15 is a diagram illustrating a format of auxiliary information recorded on an optical disk used in the apparatus according to the sixth embodiment.

The auxiliary information processing unit 100f3 includes an auxiliary information extracting circuit 108f in place of the auxiliary information extracting circuit 108 according to the first embodiment. The auxiliary information extracting circuit 108f extracts permission year/month information from the auxiliary information supplied from the read-out signal processing circuit 104 in the signal reproduction unit 100f2, and outputs the information separately from the outer auxiliary information. As shown in FIG. 15, the permission year/month information is composite permission year/month information comprising year/month information 4000 for permitting reproduction of the audio data, and nine pieces of year/month information 4100~4900 for permitting reproduction of the video data of the first to ninth channels, respectively.

To be specific, the audio permission year/month information 4000 comprises eight pieces of permission year/month information 4001~4008 corresponding to the first to eighth areas (hereinafter referred to as local permission year/month information), and 16 bits are assigned to each of the local permission year/month information, so that the audio permission year/month information 4000 is represented by 128 bits in total. That is, in each area, the reproduction permitting year is represented by 12 bits while the reproduction permitting month is represented by 4 bits.

On the other hand, each of the nine pieces of video permission year/month information 4100~4900 corresponding to the first to ninth channels comprises eight pieces of local permission year/month information corresponding to the eight areas, i.e., 4101~4108, . . . , 4901~4908. Since 16 bits are assigned to each of the local permission year/month information, the video permission year/month information of all the channels is represented by 128 bits×9 channels. Accordingly, with respect to a single piece of local permission year/month information constituting the video permission year/month information corresponding to one channel, the reproduction permitting yet is represented by 12 bits, and the reproduction permitting month is represented by 4 bits.

The auxiliary information extracting circuit 108f in the auxiliary information processing unit 100f3 extracts the audio permission year/month information and the video permission year/month information corresponding to the respective channels from the auxiliary information supplied from the read-out signal processing circuit 104, separately from the other auxiliary information.

The auxiliary information processing unit 100f3 further comprises an area code register 110 in which an area code corresponding to a specific area among the above-mentioned areas is set in advance; an audio permission year/month register 109d for selecting local audio permission year/month information corresponding to the area set in the area code register 110 from the eight pieces of audio permission year/month information corresponding to the eight areas, and storing the selected information; and a video permission year/month register 109c for selecting local video permission year/month information corresponding to the area code set in the area code register 110 from the eight pieces of local video permission year/month information corresponding to the eight areas and constituting the video permission year/month information corresponding to one channel selected by an external control signal Cm, and storing the selected information.

Furthermore, the auxiliary information processing unit 100f3 comprises a clock circuit 111 for measuring an elapsed time from a reference time, a time set circuit 112 for setting the reference time of the clock circuit 111 on the basis of a control signal from the control unit 100f4, an comparator for audio 113b for receiving outputs from the clock circuit 111 and the audio permission year/month register 109d and comparing the present time with the permission year/month, and a video comparator 113a for receiving outputs from the clock circuit 111 and the video permission year/month register 109c and comparing the present time with the permission year/month.

The control unit 100f4 comprises a system controller 114 for outputting control signals to the optical pickup driving circuit 103, the decoders 105~107, the reproduction restricting circuits 119 and 120, the video permission year/month register 109c, and the time set circuit 112 according to outputs from the comparators 113a and 113b, auxiliary information other than the audio permission year/month information and the video permission year/month information corresponding to the respective channels, extracted by the auxiliary information extracting circuit 108f, and the control signal Cm from the outside. The control unit 100f4 further comprises a communication line control circuit 115 for controlling communication between the system controller 114 and other information processing apparatus via a communication line 118.

A description is given of the operation of the information decoding and reproducing apparatus 100f.

The signal read unit 100f1 operates in the same manner as that described for the first embodiment. The signal reproduction unit 100f2 is different from the according to the first embodiment only in that channel switching is possible in both of the video decoder 106 and the sub-picture decoder 106a.

When the auxiliary information output from the read-out signal processing circuit 104 is input to the auxiliary information extracting circuit 108f, the auxiliary information extracting circuit 108f extracts the audio permission year/month information and the nine pieces of video permission year/month information corresponding to the nine channels, from the auxiliary information.

Then, the audio permission year/month register 109d selects permission year/month information of an area specified by the area code register 110 from the input audio permission year/month information corresponding to the respective areas and stores the selected information. On the other hand, the video permission year/month register 109c selects video permission year/month information corresponding to a channel set by the external control signal from the nine pieces of video permission year/month information corresponding to the nine channels and, furthermore, the register 109c selects, from the selected video permission year/month information of the set channel, permission year/month information of the area specified by the area code register 110, and stores the selected information. At this time, the other auxiliary information is sent to the system controller 114 and used for various controls as desired.

In the comparator for audio 113b, the output from the audio permission year/month register 109d is compared with the output from the clock circuit 111. In the video comparator 113a, the output from the video permission year/month register 109c is compared with the output from the clock circuit 111. In each of the comparators 113a and 113b, when the output from the clock circuit 111 (year/month/time) is larger than the output from the register, 'High' is output. When the output from the clock circuit 111 is smaller than the output from the register, 'Low' is output.

In the system controller 114, according to outputs from the comparators 113a and 113b, the video reproduction restricting circuit 119 and the audio reproduction restricting circuit 120 are controlled to restrict reproduction of the video data and the audio data. More specifically, when the signal from the comparator for audio 113b is 'High', reproduction of the audio data is inhibited. Conversely, when the signal from the comparator 113b is 'Low', reproduction of the video data is permitted. Likewise, when the signal from the video comparator 113a is 'High', reproduction of the video data is inhibited. Conversely, when the signal from the comparator 113a is 'Low', reproduction of the video data is permitted. Also in this sixth embodiment, the video data reproduction inhibiting operation, the video data reproduction permitting operation, and the time setting operation of the clock circuit 111 are identical to those mentioned for the first to third embodiments and, therefore, do not require repeated description. Furthermore, performed as the audio data reproduction inhibiting operation is to superimpose noise on the output of the audio decoder.

As described above, according to the sixth embodiment of the present invention, the information decoding and reproducing apparatus is provided with the auxiliary information extracting circuit 108f for extracting, from information read from the optical disk, eight pieces of audio permission year/month information corresponding to eight areas and nine pieces of video permission year/month information corresponding to nine channels, each comprising eight pieces of video permission year/month information corresponding to the eight areas; the audio permission year/month register 109d for selecting audio permission year/month information corresponding to a specified area code from the extracted eight pieces of audio permission year/month information of the eight areas and storing the selected information; and the video permission year/month register 109c for selecting video permission year/month information corresponding to the specified area code and to a channel selected by the user from the nine pieces of video permission year/month information of the nine channels. In this apparatus, since the present year/month is compared with the year/month defined by the selected video permission year/month information and with the year/month defined by the selected audio permission information, reproduction of the video data and the audio data read from the optical disk can be restricted for each area, independently between the video data and the audio data. Further, it is possible to perform area to area restriction of reproduction of video data in a channel selected by the user form the nine pieces of video data corresponding to the nine channels. Accordingly, the use of a software, such as a movie, can be restricted in various ways, adaptively to the sale time of the software in each area.

In the recording format of auxiliary information according to this sixth embodiment shown in FIG. 15, the eight pieces of audio permission year/month information corresponding to the first to eighth areas are recorded as a block, and the eight pieces of video permission year/month information corresponding to the first to eighth areas are recorded as a block for each channel. However, the recording format of permission year/month information is not restricted thereto.

Figure 16:
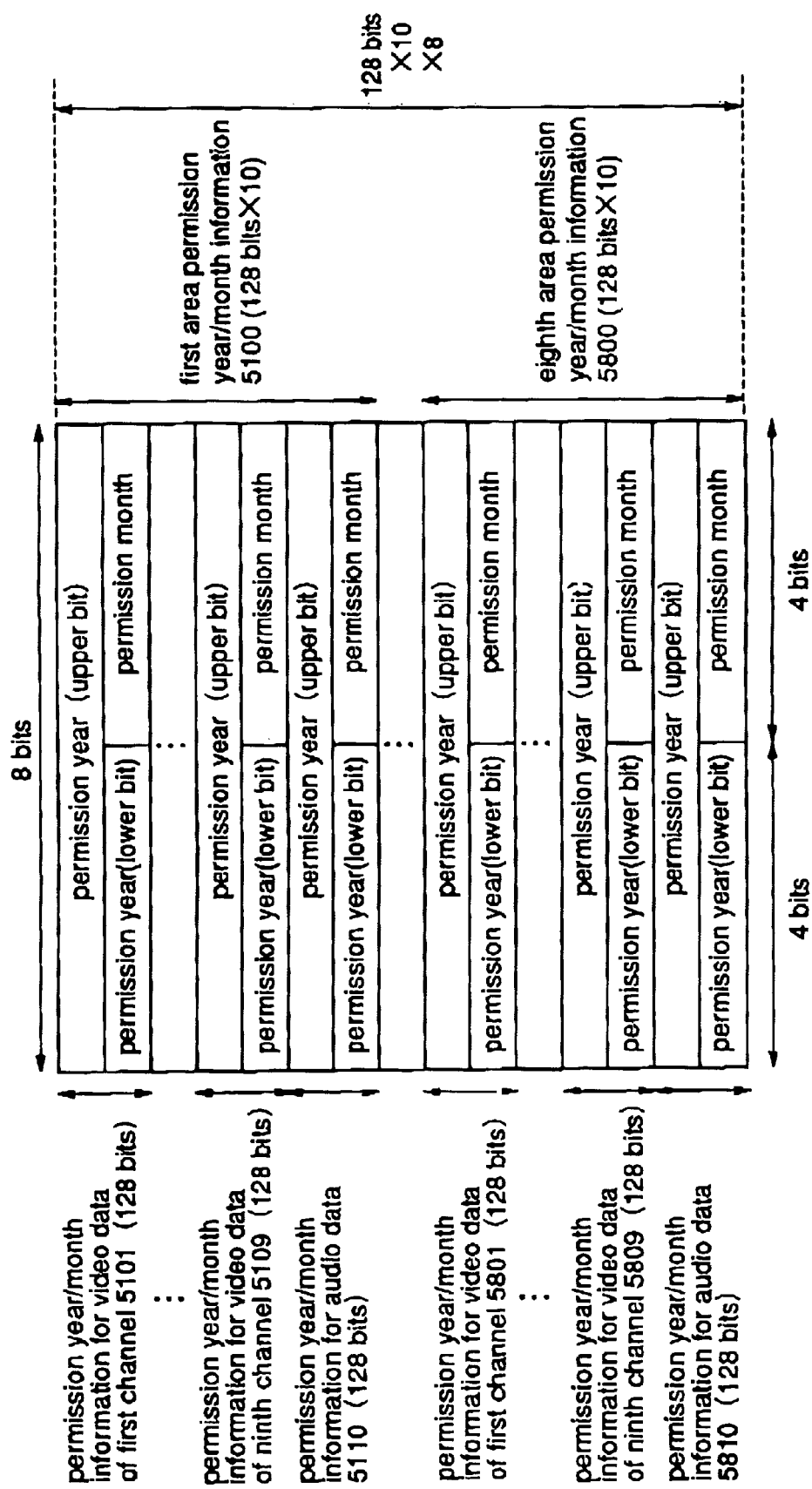
FIG. 16 is a diagram illustrating another format of auxiliary information recorded on the optical disk according to the sixth embodiment.

For example, as shown in FIG. 16, video and audio permission year/month information may be recorded as a block for each of the first to eighth areas, i.e., eight blocks of composite permission year/month information 5100~5800 respectively corresponding to the first to eighth areas are recorded. To be specific, the audio permission year/month information corresponding to each area (5110, . . . , 5810) and the nine pieces of video permission year/month information corresponding to the first to ninth channels of the corresponding area (3111~3118, . . . , 3811~3818) are recorded together as a block.

Figure 17:
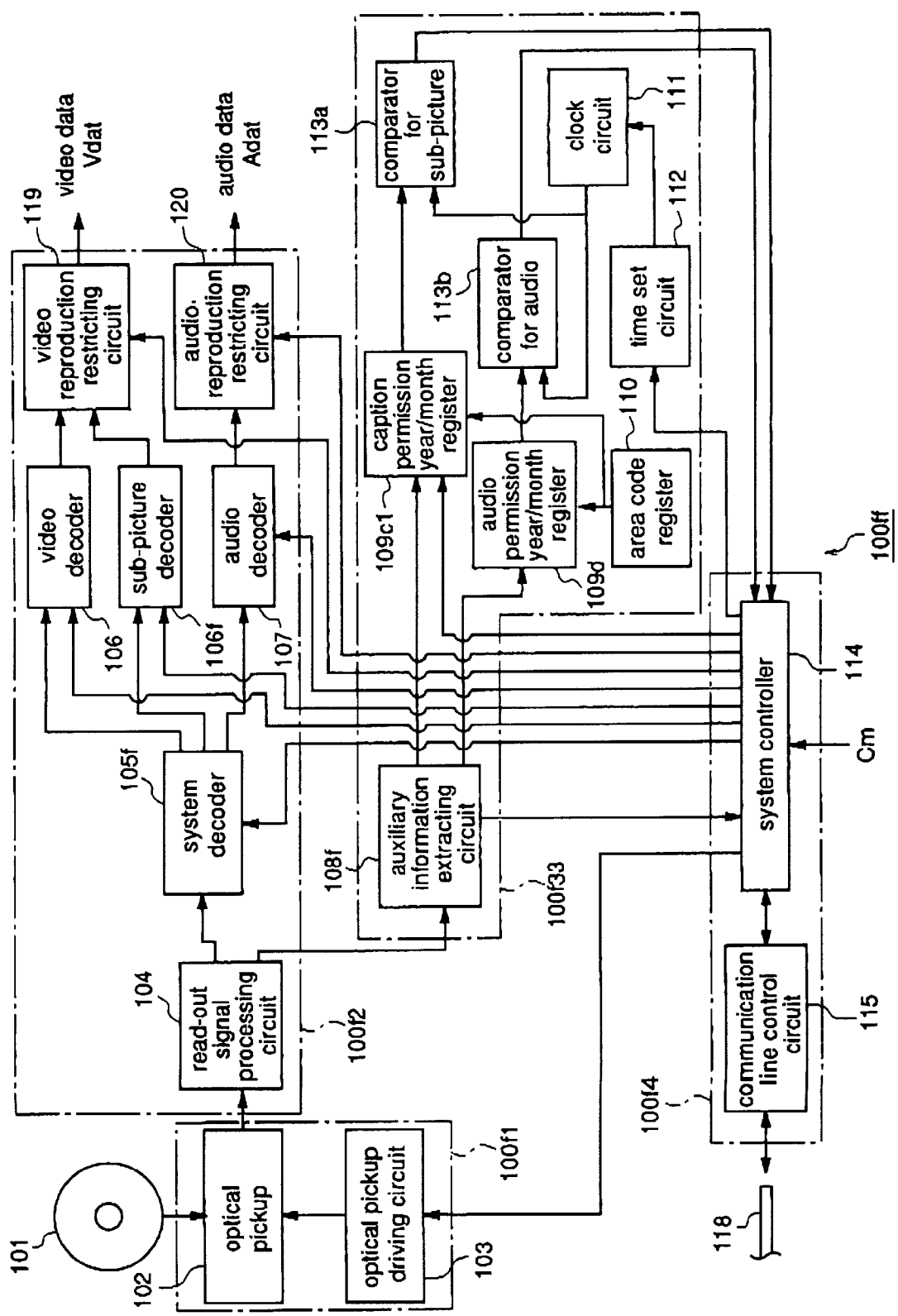
FIG. 17 is a block diagram illustrating an information decoding and reproducing apparatus according to a modification of the sixth embodiment.
Figure 18:
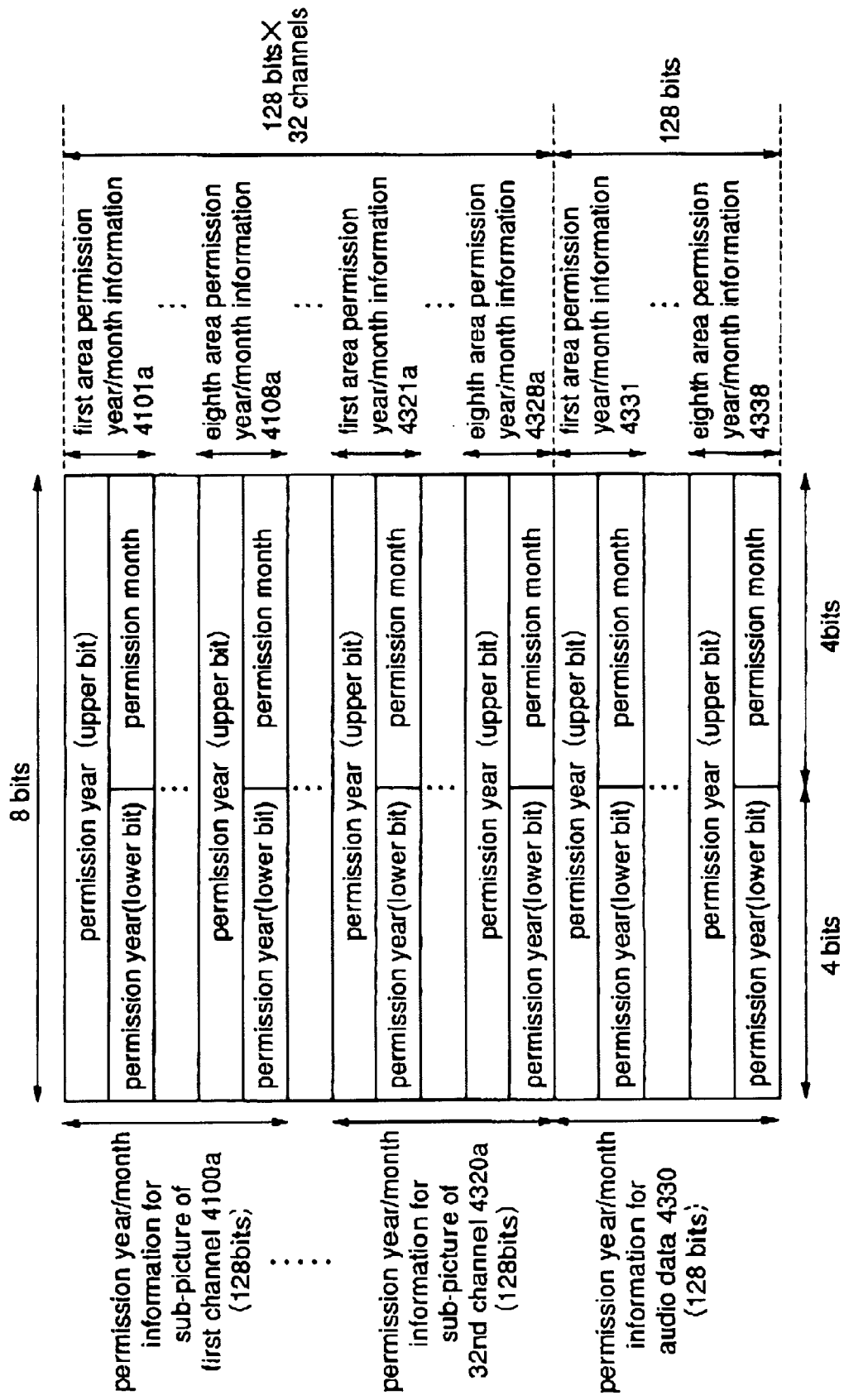
FIG. 18 is a diagram illustrating a format of auxiliary information recorded on an optical disk used in the apparatus according to the modification of the sixth embodiment.

FIGS. 17 and 18 are a block diagram and a data format diagram, respectively, for explaining an information decoding and reproducing apparatus according to a modification of the sixth embodiment.

In FIG. 17, reference numeral 100ff designates an information decoding and reproducing apparatus according to the modification of the sixth embodiment, and an auxiliary information processing unit 100f/33 of this apparatus 100ff includes a sub-picture permission year/month register 109c1, in place of the video permission year/month register 109c in the auxiliary information processing unit 100f/3 according to the sixth embodiment. The sub-picture permission year/month register 109c1 selects sub-picture permission year/month information corresponding to an area code set in the area code register 110 from eight pieces of sub-picture permission year/month information corresponding to the eight areas and constituting sub-picture permission year/month information corresponding to one channel selected by an external control signal Cm, and stores the selected information.

As shown in FIG. 18, the permission year/month information is composite permission year/month information comprising year/month information 4330 for permitting reproduction of the audio data, and thirty-two pieces of year/month information 4100a~4320a for permitting reproduction of the sub-picture data of the first to thirty-second channels, respectively.

To be specific, the audio permission year/month information 4330 comprises eight pieces of local permission year/month information 4331~4338 corresponding to the first to eighth areas, and 16 bits are assigned to each of the local permission year/month information, so that the audio permission year/month information 4330 is represented by 128 bits in total. That is, in each area, the reproduction permitting year is represented by 12 bits while the reproduction permitting month is represented by 4 bits.

On the other hand, each of the thirty-two pieces of sub-picture permission year/month information 4100a~4320a corresponding to the first to thirty-second channels comprises eight pieces of local permission year/month information corresponding to the eight areas, i.e., 4101a~4108a, . . . , 4321a~4328a. Since 16 bits are assigned to each of the local permission year/month information, the sub-picture permission year/month information of all the channels is represented by 128 bits×32 channels. Accordingly, with respect to a single piece of local permission year/month information constituting the sub-picture permission year/month information corresponding to one channel, the reproduction permitting year is represented by 12 bits, and the reproduction permitting month is represented by 4 bits.

Other constituents are identical to those described for the sixth embodiment and, therefore, do no require repeated description.

As described above, according to the modification of the sixth embodiment, the information decoding and reproducing apparatus is provided with the auxiliary information extracting circuit 108f for extracting, from information read from the optical disk, eight pieces of audio permission year/month information corresponding to eight areas and thirty-two pieces of sub-picture permission year/month information corresponding to thirty-two channels, each comprising eight pieces of sub-picture permission year/month information corresponding to the eight areas; the audio permission year/month register 109d for selecting audio permission year/month information corresponding to a specified area code from the extracted eight pieces of audio permission year/month information of the eight areas and storing the selected information; and the sub-picture permission year/month register 109c1 for selecting sub-picture permission year/month information corresponding to the specified area code and to a channel selected by the user from the thirty-two pieces of sub-picture permission year/month information of the thirty-two channels. In this apparatus, since the present year/month is compared with the year/month defined by the selected sub-picture permission year/month information and with the year/month defined by the selected audio permission information, reproduction of the sub-picture data and the audio data read from the optical disk can be restricted for each area, independently between the sub-picture data and the audio data. Further, it is possible to perform area to area restriction of reproduction of sub-picture data in a channel selected by the user form the thirty-two pieces of sub-picture data corresponding to the thirty-two channels. Accordingly, the use of a software, such as a movie, can be restricted in various ways, adaptively to the sales time of the software in each area.

[Embodiment 7]

Figure 19:
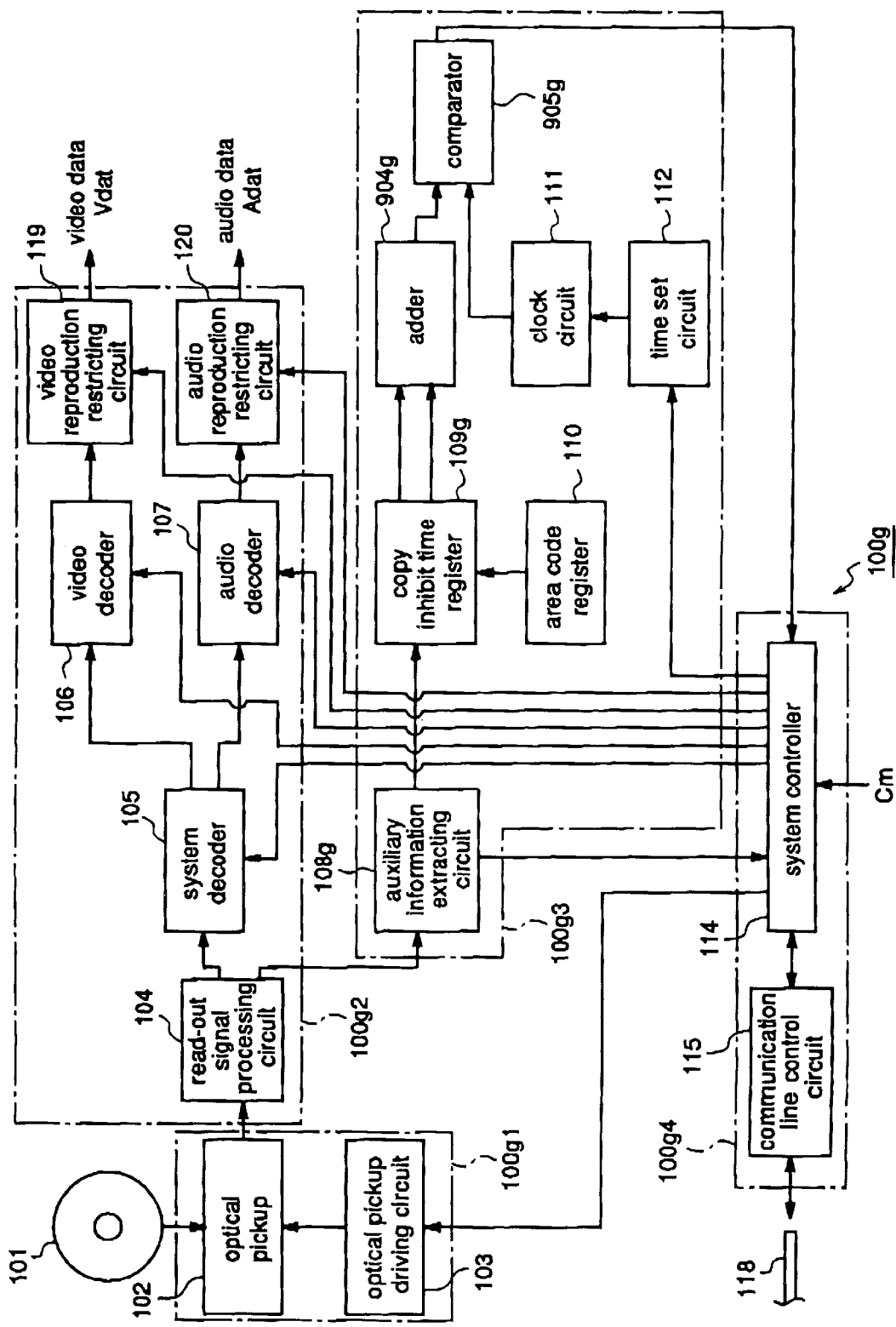
FIG. 19 is a block diagram illustrating an information decoding and reproducing apparatus according to a seventh embodiment of the invention.

FIG. 19 is a block diagram illustrating an information decoding and reproducing apparatus according to a seventh embodiment of the present invention.

In FIG. 19, reference numeral 100g designates an information decoding and reproducing apparatus for decoding and reproducing video information and audio information compressively recorded on an optical disk 101, like the information decoding and reproducing apparatus 100a according to the first embodiment.

The information decoding and reproducing apparatus 100g comprises an information read unit 100g1, a signal reproduction unit 100g2, an auxiliary information processing unit 100g3, and a control unit 100g4. The information read unit 100g1 is identical to the information read unit 100a1 according to the first embodiment. The signal reproduction unit 100g2 is different from the signal reproduction unit 100a2 according to the first embodiment only in the operation of the video reproduction restricting circuit 119. That is, when copy of decoded video data from the video decoder 106 is restricted, the video reproduction restricting circuit 119 superimposes a copy guard signal on the decoded video data and outputs the data as video data $V_{dat}$. When copy of the decoded video data from the video decoder 106 is not restricted, the circuit 119 outputs the decoded video data as video data $V_{dat}$.

In this seventh embodiment, the auxiliary information processing unit 100g3 includes an auxiliary information extracting circuit 108g in place of the auxiliary information extracting circuit 108 according to the first embodiment. The auxiliary information extracting circuit 108g selects copy inhibit time information, i.e., information giving a period from the sales year/month, during which copy of the video data is inhibited, from the auxiliary information supplied from the read-out signal processing circuit 104 in the signal reproduction unit 100g2, and outputs the selected information separately from the other auxiliary information.

Figure 20:
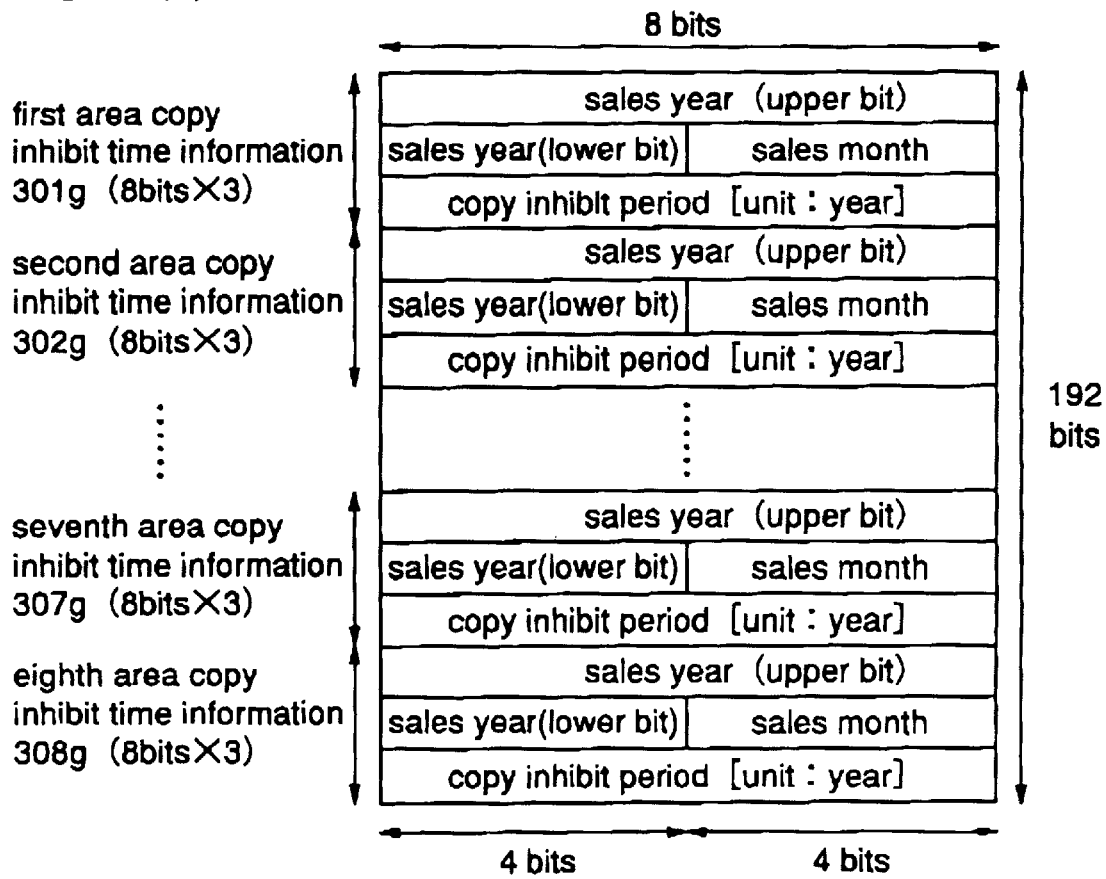
FIGS. 20($a$) and 20($b$) are diagrams illustrating a format of auxiliary information recorded on an optical disk used in the apparatus according to the seventh embodiment.

FIG. 20(*a*) shows an example of a format of the copy inhibit time information. As shown in FIG. 20(*a*), each of eight pieces of copy inhibit time information 301g~308g respectively corresponding to the first to eighth areas is given 24 bits (8 bits×3), so that the copy inhibit time information is represented by 192 bits as a whole. To be specific, the copy inhibit time information comprises sales year/month information and copy inhibit period information, and the year of the sales year/month information is represented by 12 bits while the month is represented by 4 bits. Further, the copy inhibit period information is given 8 bits per year. Accordingly, as shown in figure 20(*b*), when the copy inhibit period information is encoded, 'no inhibit period' is represented by code 0, 'inhibit periods' of 1~254 years are represented by codes 1~254, respectively, and 'permanent inhibition' is represented by code 255.

The auxiliary information processing unit 100g3 further comprises an area code register 100 in which an area code corresponding to a specific area among the above-mentioned target areas is set in advance; a copy inhibit time register 109g for selecting copy inhibit time information corresponding to the area set in the area code register 110, as the sales year/month information and the copy inhibit period information, from the copy inhibit time information corresponding to the respective areas extracted by the auxiliary information extracting circuit 100g, and storing the selected information; and an adder 904g for adding the sales year/month information and the copy inhibit period information stored in the register.

Further, the auxiliary information processing unit 100g3 comprises a clock circuit 111 and a time set circuit 112 identical to those employed for the first embodiment, and a comparator 905g for receiving an output from the clock circuit 111 and an output from the adder 904g and comparing the present year/month with the permission year/month.

The control unit 100g4 comprises a system controller 114 for outputting control signals to the optical pickup driving circuit 103, the decoders 105~107, the reproduction restricting circuits 119 and 120, and the time set circuit 112 according to an output from the comparator 905g, auxiliary information other than the copy inhibit time information, extracted by the auxiliary information extracting circuit 108g, and a control signal Cm from the outside. The control unit 100g4 further comprises a communication line control circuit 115 for controlling communication between the system controller 114 and other information processing apparatus via a communication line 118. Furthermore, in this seventh embodiment, to restrict reproduction of video data, a copy guard signal is superimposed on an output from the video decoder 116 in the video reproduction restricting circuit 119 according to the result of the comparison.

A description is given of the operation of the information decoding and reproducing apparatus.

The signal read unit 100g1 and the signal reproduction unit 100g2 operate in the same manner as those mentioned for the first embodiment.

In this seventh embodiment, when the auxiliary information output from the read-out signal processing circuit 104 is input to the auxiliary information extracting circuit 108g, the auxiliary information extracting circuit 108g extracts the copy inhibit time information from the auxiliary information, separately from the other auxiliary information.

Then, the copy inhibit time register 109g selects copy inhibit time information of an area specified by the area code register 110 from the input copy inhibit time information corresponding to the respective areas, and stores the selected information. At this time, the other auxiliary information is set to the system controller 114 and used for various controls as desired.

In the adder 904g, the sales year/month information and the copy inhibit period information, which have been stored in the register 109g as the copy inhibit time information, are added. In comparator 905g, an output from the adder 904g is compared with an output from the clock circuit 111. When the output from the adder 904g is larger than the output from the clock circuit 111 (year/month/time), 'High' is output from the comparator 905g. Conversely, when the output from the adder 904g is smaller than the output from the clock circuit 111, 'Low' is output from the comparator 905 g.

The system controller 114 controls the video reproduction restricting circuit 119 according to the output from the comparator 905 g so that a copy guard signal is superimposed on the output from the video decoder 106. More specifically, when the signal from the comparator 905 g is 'High', a copy guard signal is superimposed on the video data. When the signal from the comparator 905 g is 'Low', no copy guard signal is superimposed on the video data.

As described above, according to the seventh embodiment of the present invention, the information decoding and reproducing apparatus is provided with the auxiliary information extracting circuit 108 g for extracting, from the auxiliary information read from the optical disk, copy inhibit time information set for each of the target areas, i.e., information giving a period from the sales year/month in each area, during which copy of video data is inhibited; and the copy inhibit time register 109 g for selecting copy inhibit time information corresponding to a specified area code from the extracted copy inhibit time information corresponding to the respective target areas. In this apparatus, according to whether or not the present year/month is within the copy inhibit period shown by the copy inhibit time information, the process of superimposing a copy guard signal on the output from the video decoder is controlled. Therefore, copy of video data recorded on media such as optical disks can be inhibited for a prescribed period of time in each area, whereby the use of a software, such as a movie, can be restricted in various ways.

Although in this seventh embodiment emphasis has been placed on copy restriction of video data, the copy restriction of recorded information described above may be applied to audio data. In this case, copy of audio data can be restricted by, for example, superimposing a copy guard signal on the audio data.

[Embodiment 8]

Figure 21:
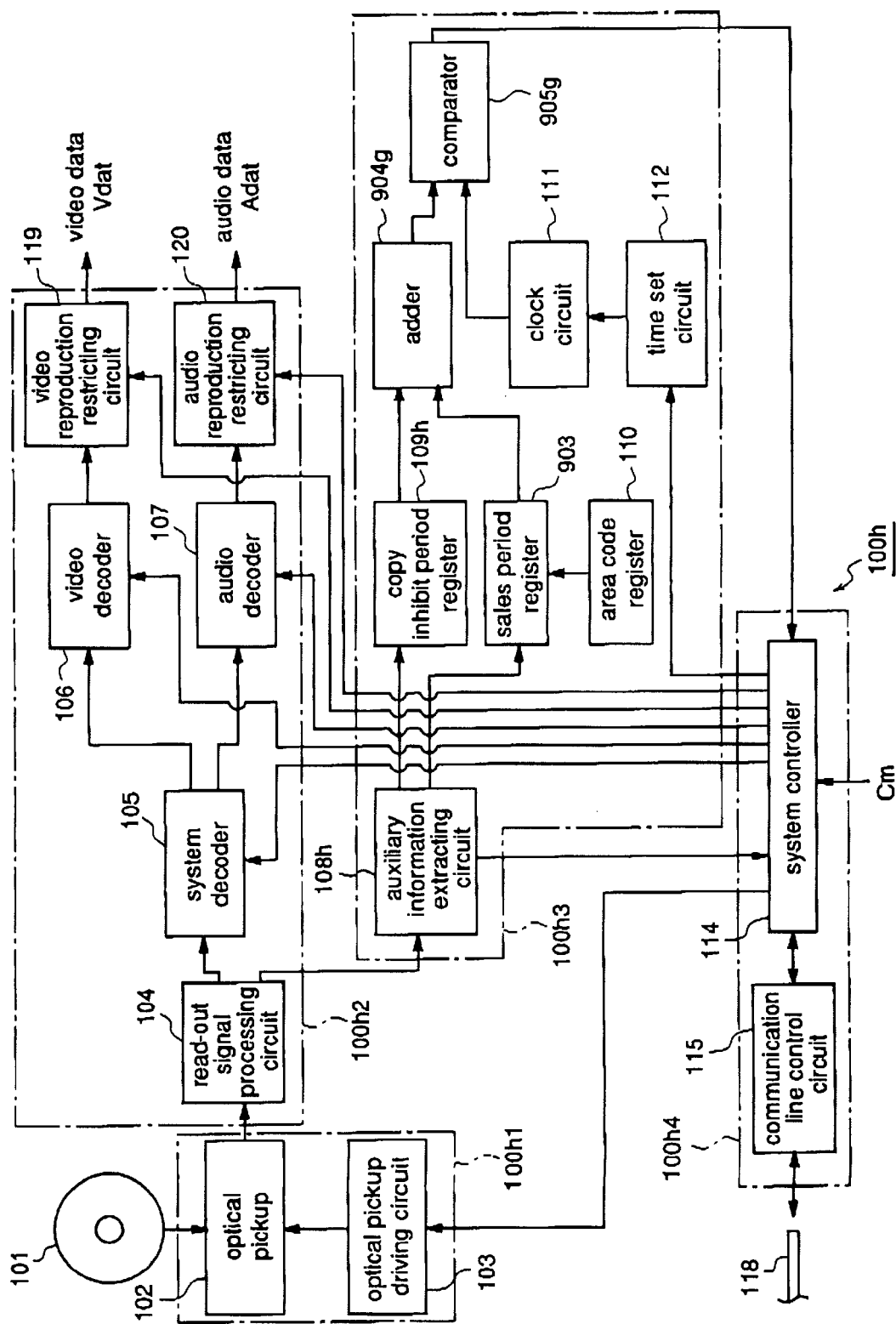
FIG. 21 is a block diagram illustrating an information decoding and reproducing apparatus according to an eighth embodiment of the invention.

FIG. 21 is a block diagram illustrating an information decoding and reproducing apparatus according to an eighth embodiment of the present invention.

In FIG. 21, reference numeral 100h designates an information decoding and reproducing apparatus for decoding and reproducing video information and audio information compressively recorded on an optical disk 101, like the information decoding and reproducing apparatus 100a according to the first embodiment. Also in this embodiment, a copy inhibit period can be set for each of target areas.

The information decoding and reproducing apparatus 100h comprises an information read unit 100h1, a signal reproduction unit 100h2, an auxiliary information processing unit 100h3, and a control unit 100h4. The information read unit 100h1, the signal reproduction unit 100h2, and the control unit 100h4 are identical to those described for the seventh embodiment.

In this eighth embodiment, the auxiliary information processing unit 100h3 includes an auxiliary information extracting circuit 108h in place of the auxiliary information extracting circuit 108g according to the seventh embodiment. The auxiliary information extracting circuit 108h receives auxiliary information supplied from the read-out signal processing circuit 104 in the signal reproduction unit 100h2 and extracts, from the auxiliary information, copy inhibit period information, i.e., year/month information 1000a defining a period from the sales year/month, during which copy of video data is inhibited, and eight pieces of sales year/month information 1001~1008 respectively set for the first to eighth areas, separately from the other auxiliary information.

Figure 22:
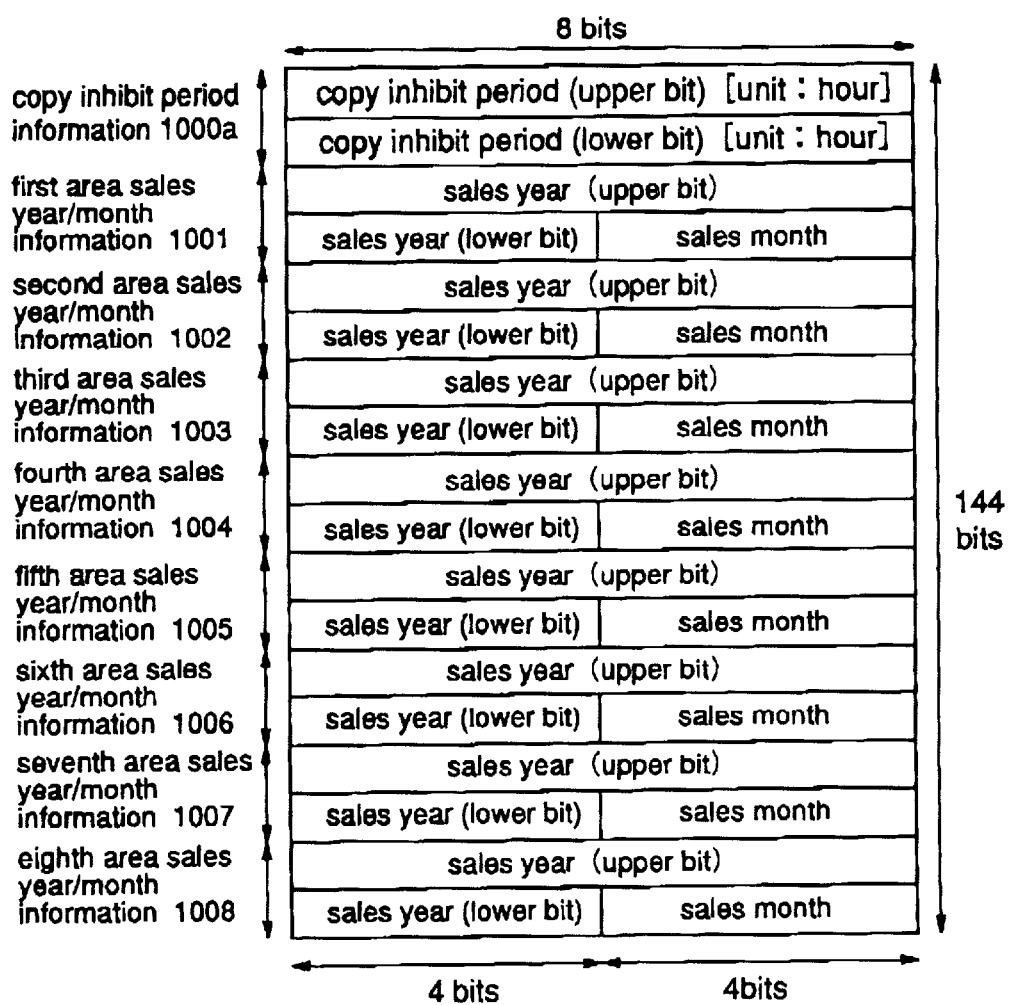
FIG. 22 is a diagram illustrating a format of auxiliary information recorded on an optical disk used in the apparatus according to the eighth embodiment.

FIG. 22 shows an example of a format of copy inhibit period information and sales year/month information for each area. As shown in FIG. 22, in copy inhibit period information 100a common to the respective areas, upper 8 bits and lower 8 bits are given. 16 bits are given to each of eight pieces of sales year/month information corresponding to the first to eighth areas, and the year of each sales year/month information is represented by 12 bits while the month is represented by 4 bits. Since the copy inhibit period information is represented in hours, the period can be set in a range from 0 to 65535 hours (=about 2730 days).

Further, the auxiliary information processing unit 100h3 further comprises an area code register 110 in which an area code corresponding to a specific area among the above-mentioned target areas is set in advance; a copy inhibit period register 109h for storing the copy inhibit period information extracted by the auxiliary information extracting circuit 108h; a sales year/month register 903 for selecting sales year/month information of the area corresponding to the set area code, from the sales year/month information corresponding to the respective areas; and an adder 904g for adding the sales year/month information and the copy inhibit period information stored in the registers.

Further, the auxiliary information processing unit 100h3 includes a clock circuit 111 and a time set circuit 112 identical to those employed for the seventh embodiment, and a comparator 905g for receiving an output from the clock circuit 111 and an output from the adder 904g and comparing the present year/month with the permission year/month.

The control unit 100h4 is identical to the control unit 100g4 according to the seventh embodiment.

A description is given of the operation of the information decoding and reproducing apparatus.

The signal read unit 100h1 and the signal reproduction unit 100h2 operate in the same manner as those mentioned for the first embodiment.

In this eighth embodiment, when the auxiliary information output from the read-out signal processing circuit 104 is input to the auxiliary information extracting circuit 108h, the auxiliary information extracting circuit 108h extracts the copy inhibit period information 1000a and the eight pieces of sales year/month information 1001~1008 from the auxiliary information, separately from the other auxiliary information.

The copy inhibit period information 1000a is stored in the copy inhibit period register 109h. The sales year/month register 903 selects sales year/month information of an area specified by the area code register from the sales year/month information corresponding to the respective areas, and stores the selected information. At this time, the other auxiliary information is sent to the system controller 114 and used for various controls as desired.

The adder 904g and the comparator 905g operate in the same way as described for the seventh embodiment. The system controller 114 controls the video reproduction restricting circuit 119 according to the output from the comparator 905g so that a copy guard signal is superimposed on the output from the video decoder 106. More specifically, when the signal from the comparator 905g is 'High', a copy guard signal is superimposed on the video data. When the signal from the comparator 950g is 'Low', no copy guard signal is superimposed on the video data.

As described above, according to the eighth embodiment of the present invention, the information decoding and reproducing apparatus is provided with the auxiliary information extracting circuit 108h for extracting, from the auxiliary information read from the optical disk, plural pieces of sales year/month information set for the respective target areas and copy inhibit period information common to the respective areas, i.e., year/month information giving a period during which copy of video data is inhibited from the sales year/month; and the sales year/month register 903 for selecting sales year/month information corresponding to the set area code from the extracted sales year/month information corresponding to the respective areas. In this apparatus, according to whether or not the present year/month is within the copy inhibit period shown by the copy inhibit time information, the process of superimposing a copy guard signal on the output from the video decoder is controlled. Therefore, copy of video data recorded on media such as optical disks can be inhibited for a prescribed period of time in each area, whereby the use of a software, such as a movie, can be restricted in various ways.

In the aforementioned embodiments, eight areas are defined, and a marketing area of a software is divided into plural sub-areas on the basis of countries, and each sub-area is assigned to one of the defined eight areas. However, the number of defined areas and the basis of the division of the marketing area are not restricted thereto. Furthermore, the number of bits assigned to year/month information in the auxiliary information is not restricted to those described in the above embodiments, i.e., the bit number can be increased or decreased as desired.

While in the aforementioned embodiments auxiliary information is added for each title, the unit of addition of the auxiliary information may be larger than a title. For example, a plurality of titles is grouped according to concepts each common to several titles, and auxiliary information is added to each group. Alternatively, the unit of addition of the auxiliary information may be smaller than a title. For example, recorded information corresponding to a single title is divided into plural portions, and reproduction restriction for a prescribed period of time according to any of the first to third embodiments is performed to some of the portions while trial permission of reproduction according to the fourth embodiment is performed for the rest of the portions.

Further, in the aforementioned embodiments, a recording position of auxiliary information on the optical disk is specified according to the file management information, and the auxiliary information is extracted by the auxiliary information extracting circuit. However, when header information defining that the auxiliary information is data other than video and audio data is additionally inserted in a system stream based on MPEG2, like the video data, the auxiliary information can be extracted by the system decoder according to the header information.

Although the video and audio data compressing method described in the aforementioned embodiments in MPEG2, the data compressing method is not restricted to MPEG.

Further, although in the aforementioned embodiments recorded information has been subjected to data compression, uncompressed information may be employed. For example, audio data recorded without being compressed because it has less amount of information compared with video data, and video data recorded without being compressed on a video disk by FM modulation or the like, can be employed. It is possible to restrict reproduction of these data in the same manner as mentioned for the above embodiments.

Furthermore, information recorded on the information recording medium, i.e., the optical disk 101, is not restricted to video information, sub-picture information, and audio information. For example, a recorded program, such as a computer software used for game or office work, can be subjected to reproduction restriction in the same manner as that for video and audio information.

Moreover, although in the aforementioned embodiments optical disks are employed as recording media, other recording media may be employed, for example, recording media in which information is recorded on the basis of the magnetic recording and reproduction principle or other principles, or recording media other than disks, such as cards and tapes.

What is claimed is:

1. An information reproducing apparatus for reading out main information to be a target of reproduction and auxiliary information to control reproduction of the main information from an information recording medium or media having recorded thereon information comprising the main information and the auxiliary information, and reproducing the main information according to the auxiliary information, said apparatus comprising:

reproduction restricting information extracting means for extracting reproduction restricting information used for reproduction restriction of a part of the whole of the read-out main information, from the read-out auxiliary information;

reproduction restriction decision means, including an information recording unit storing a specific fixed information including specified area information among plural defined areas and a reference time to be a standard of the apparatus which are set in advance to be unchangeable by a user corresponding to the apparatus, for deciding a prescribed mode of various modes of reproduction restriction including a mode in which reproduction restriction is not performed based on the specified fixed information and the extracted reproduction restriction information; and reproduction restricting means for performing reproduction restriction of a part or the whole of the read-out main information in the mode of reproduction restriction decided by the reproduction restriction decision means, wherein the reproduction restricting information includes plural pieces of local reproduction restricting information which correspond to plural areas, and the reproduction restricting information extracting means includes means for selecting the local reproduction restricting means corresponding to a specified area from the plural pieces of local reproduction restricting information constituting the reproduction restricting information, and the reproduction restriction decision means includes clock means for outputting time information on the basis of the reference time as the present time information and comparison decision means for comparing year/month shown by the reproduction restricting information extracted by the reproduction restricting information extracting means with the present year/month output by the clock means, to decide the before/after relationship between them.

2. The information reproducing apparatus of claim 1 wherein each of the plural pieces of local reproduction restricting information provides a time in which reproduction of the main information is permitted in the corresponding area.

3. The information reproducing apparatus of claim 1, further comprising:

an information reproducing apparatus which includes a clock setting means for obtaining a correct time information of the standard time which is unchangeable by a user via a communication circuit from an external information source, and setting the time to the correct time, and a communication circuit controlling means for obtaining the correct time information from the communication circuit under a control of the apparatus.

4. The information reproducing apparatus of claim 1 wherein:

the main information being a target of reproduction includes at least video information between video information and audio information; and the reproduction restricting means performs a reproduction restricting process of the video information so that the quality of a display image by the read-out video information is degraded.

5. The information reproducing apparatus of claim 1 wherein:

the main information being a target of reproduction contains at least audio information between video information and audio information; and the reproduction restricting means performs a reproduction restricting process of the audio information so that a quality of reproduced sound by the read-out audio information is degraded.

6. The information reproducing apparatus of claim 1 wherein:

the main information being a target of reproduction includes at least one of video information and audio information; and the reproduction restricting means performs, as a reproduction restricting process of the main information, a process of stopping reproduction of a part of the whole of at least one of read-out video information and read-out audio information.

7. The information reproducing apparatus of claim 1 wherein the main information being a target of reproduction includes at least one of video information and audio information which are compressively encoded and recorded on an information recording medium or media.

8. The information reproducing apparatus of claim 1 further comprising:

reproduction control means for controlling reproduction of the read-out main information;

a display unit having an display screen and displaying video information included in the main information on the screen; and the reproduction control means having a message storage unit in which plural pieces of message information for explaining various modes of reproduction restriction are stored, and controlling the display unit so that, when reproduction restriction of the main information is being carried out, message information corresponding to the mode of the reproduction restriction is displayed on the screen of the display unit.

9. An information recording medium or media having recorded thereon information comprising main information to be a target of reproduction and auxiliary information for controlling reproduction of the main information, wherein the auxiliary information includes reproduction restricting information for performing reproduction restriction of a part of the whole of the main information, the reproduction restriction information comprises information for controlling the information reproduction apparatus so that a reproduction restriction in the information reproduction apparatus can be performed in a prescribed mode decided based on the reproduction restriction information and a specific fixed information set in the information reproduction apparatus for performing a reproduction of the main information, the reproduction restricting information performs the reproduction restriction in prescribed modes which correspond to the respective areas and include a mode in which a reproduction restriction is not performed, on the basis of plural pieces of local reproduction restricting information which are set in advance and respectively correspond to plural defined areas, and the local reproduction restricting means include at least one of a time in which the reproduction restriction is started, a time in which the reproduction restriction is ended, and a period during which the reproduction restriction is carried out.

10. The information recording medium of claim 9 wherein the local reproduction restricting information defines, for the corresponding area, a time in which reproduction of the main information is permitted.

11. The information recording medium of claim 9 wherein the main information being a target of reproduction includes at least one of video information and audio information.

12. The information recording in medium of claim 9 wherein the main information being a target of reproduction includes at least one of video information and audio information which are compressively encoded and recorded.

* * * * *